United States Patent
Hickie

(10) Patent No.: US 11,193,236 B2
(45) Date of Patent: Dec. 7, 2021

(54) VAPOR-PERMEABLE, SUBSTANTIALLY WATER-IMPERMEABLE, CORROSION-INHIBITING COMPOSITES AND METHODS OF MAKING THE SAME

(71) Applicant: AVINTIV Specialty Materials Inc., Charlotte, NC (US)

(72) Inventor: Brian Andrew Hickie, Hendersonville, TN (US)

(73) Assignee: AVINTIV Specialty Materials Inc., Charlotte, NC (US)

(*) Notice: Subject to any disclaimer, the term of this patent is extended or adjusted under 35 U.S.C. 154(b) by 752 days.

(21) Appl. No.: 15/017,956

(22) Filed: Feb. 8, 2016

(65) Prior Publication Data
US 2016/0230333 A1     Aug. 11, 2016

Related U.S. Application Data

(60) Provisional application No. 62/112,878, filed on Feb. 6, 2015.

(51) Int. Cl.
*D06N 3/00*     (2006.01)
*B32B 5/02*     (2006.01)
(Continued)

(52) U.S. Cl.
CPC .......... *D06N 3/0059* (2013.01); *B32B 5/022* (2013.01); *B32B 5/26* (2013.01); *B32B 7/04* (2013.01);
(Continued)

(58) Field of Classification Search
None
See application file for complete search history.

(56) References Cited

U.S. PATENT DOCUMENTS 3,257,757 A * 6/1966 Bedard .................. E05F 15/50
49/357
6,046,118 A * 4/2000 Jones ........................ B32B 5/26
442/57
(Continued)

FOREIGN PATENT DOCUMENTS

| EP | 0825019 A2 | 2/1998 |
|----|------------|--------|
| JP | H06247473 A | 9/1994 |
| JP | H06286762 A | 10/1994 |

OTHER PUBLICATIONS

International Search Report and Written Opinion of corresponding application PCT/US2016/016942, dated May 9, 2016, all enclosed pages cited.

*Primary Examiner* — Arti Singh-Pandey
(74) *Attorney, Agent, or Firm* — Burr & Forman LLP

(57) ABSTRACT

Vapor-permeable, substantially water-impermeable, corrosion-inhibiting composites are disclosed herein. For instance, disclosed herein are composites comprising a first layer comprising a first nonwoven; and a second layer adjacent to and mechanically integrated with the first layer, the second layer comprising a polymer having a melt flow index of about 10 g/10 mins to about 200 g/10 mins, and a corrosion inhibitor, wherein the composite has a moisture vapor transmission rate of from about 25 $g/m^2/day$ to about 1000 $g/m^2/day$ when measured at about 23° C. and about 50% relative humidity. Also disclosed herein are methods of making and using the same.

14 Claims, 18 Drawing Sheets

(51) Int. Cl.
  *B32B 27/32* (2006.01)
  *B32B 7/04* (2019.01)
  *B32B 7/10* (2006.01)
  *B32B 27/18* (2006.01)
  *B32B 27/12* (2006.01)
  *B32B 5/26* (2006.01)
  *D04H 1/56* (2006.01)
  *D06N 3/04* (2006.01)

(52) U.S. Cl.
  CPC ............... *B32B 7/10* (2013.01); *B32B 27/12* (2013.01); *B32B 27/18* (2013.01); *B32B 27/32* (2013.01); *D04H 1/56* (2013.01); *D06N 3/0011* (2013.01); *D06N 3/0088* (2013.01); *D06N 3/045* (2013.01); *B32B 2255/02* (2013.01); *B32B 2255/26* (2013.01); *B32B 2262/0253* (2013.01); *B32B 2262/0276* (2013.01); *B32B 2307/724* (2013.01); *B32B 2307/7246* (2013.01); *B32B 2307/7265* (2013.01); *B32B 2307/752* (2013.01); *B32B 2457/00* (2013.01); *B32B 2571/00* (2013.01); *D10B 2321/022* (2013.01)

(56) References Cited

U.S. PATENT DOCUMENTS

| | | | |
|---|---|---|---|
| 6,100,208 A * | 8/2000 | Brown | B01J 23/96 442/364 |
| 6,794,317 B2 | 9/2004 | Elkouh et al. | |
| RE38,852 E | 10/2005 | Quinones | |
| 7,476,438 B2 | 1/2009 | Gorres | |
| 8,519,033 B2 | 8/2013 | Mizukami et al. | |
| 8,637,139 B2 | 1/2014 | Todt et al. | |
| 2003/0151159 A1 | 8/2003 | Santisteban et al. | |
| 2004/0023585 A1* | 2/2004 | Carroll | B32B 27/12 442/381 |
| 2004/0029469 A1* | 2/2004 | Anderson | B32B 27/12 442/77 |
| 2005/0178500 A1 | 8/2005 | Chevrette et al. | |
| 2007/0054579 A1* | 3/2007 | Baker, Jr. | A41D 31/02 442/364 |
| 2010/0255247 A1 | 10/2010 | Elkouh et al. | |
| 2011/0198540 A1 | 8/2011 | Reinhard et al. | |
| 2012/0058294 A1 | 3/2012 | Todt et al. | |
| 2012/0171409 A1 | 7/2012 | Todt et al. | |

* cited by examiner

VAPOR-PERMEABLE, SUBSTANTIALLY WATER-IMPERMEABLE, CORROSION-INHIBITING COMPOSITES AND METHODS OF MAKING THE SAME

CROSS-REFERENCE TO RELATED APPLICATIONS

This patent application claims the priority benefit of U.S. Provisional Application No. 62/112,878 filed on Feb. 6, 2015, the contents of which are incorporated herein by reference.

TECHNICAL FIELD

This disclosure relates to vapor-permeable, substantially water-impermeable, corrosion-inhibiting composites, as well as related products and methods.

BACKGROUND

Composites that are breathable (i.e., vapor-permeable and substantially water-impermeable) have been prepared for multiple applications. These composites have been heretofore prepared by laminating various plastic layers together using adhesives. However, improved methods for making breathable, corrosion-inhibiting composites are desired.

SUMMARY

Disclosed herein are composites that are vapor-permeable, substantially water-impermeable, and corrosion inhibiting. The composites comprise a first layer comprising a first nonwoven, and a second layer comprising a polymer and a corrosion inhibitor. The first layer is adjacent to and mechanically integrated with a second layer. In some embodiments of the invention, the first layer is melt bonded to the second layer. In some embodiments of the invention, the composite can have a moisture vapor transmission rate (MVTR) of from about 25 g/m²/day to about 1000 g/m²/day (e.g., about 50 g/m²/day to about 500 g/m²/day) when measured at about 23° C. and about 50% relative humidity.

In some embodiments of the invention, the polymer in the second layer comprises a polymer (e.g., a polyolefin such as low-density polyethylene or propylene-ethylene copolymer). The polymer can have a melt flow index of about 10 g/10 mins to about 300 g/10 mins (e.g., about 20 g/10 mins to about 200 g/10 mins). The second layer of the composite can have a film weight of from about 15 g/m² to about 200 g/m². In some embodiments, the polymer is present in the second layer in an amount of at least about 50% to about 99%, by weight of the second layer. In some embodiments of the invention, the second layer comprises an additional polymer that does not have a melt flow index of about 10 g/10 min to about 300 g/10 min.

The second layer also comprises a corrosion inhibitor e.g., morpholine according to an embodiment of the invention. The second layer may further comprise a carrier e.g., silica according to an embodiment of the invention for the corrosion inhibitor. The corrosion inhibitor can be present in an amount of about 0.5% to about 5%, by weight of the second layer.

In some embodiments of the invention, the composite further comprises a third layer adjacent to and mechanically integrated with the second layer, wherein the third layer comprises a second nonwoven. In some embodiments of the invention, the third layer is melt bonded to the second layer.

The composite can be substantially free of an adhesive in certain embodiments of the invention. For example, in some embodiments of the invention, the composite does not comprise an adhesive layer bonding the first layer to the second later or second layer to the third layer.

One or more of the first nonwoven and the second nonwoven of the invention may include a spunbond layer. According to some exemplary embodiments of the invention, the first nonwoven and/or the second nonwoven may comprise a polyester, a polyolefin (e.g., polypropylene, a polyethylene, or a mixture thereof), or a mixture thereof. The first nonwoven and/or the second nonwoven can have a basis weight of from of about 15 g/m² to about 120 g/m². In some embodiments, a surface of one or more of the first nonwoven and second nonwoven, independently, includes a hydrophilic coating and/or a hydrophobic coating.

The composite can have a variety of properties, including but not limited to being vapor-permeable, substantially water-impermeable, corrosion-inhibiting, drapable, ultraviolet (UV) resistant, or a mixture thereof. The composite of can have a hydrostatic head of from about 20 cm to about 200 cm.

The composite disclosed herein can be used a as a protective cover (e.g., a grill cover, a gun cover, an outdoor furniture cover, a vehicle cover).

Also disclosed herein are methods of producing the composites disclosed herein. The method can include extruding a corrosion-inhibiting mixture comprising a polymer having a melt flow index of about 10 g/10 mins to about 200 g/10 mins and a corrosion inhibitor onto a surface of a first nonwoven at an extrusion temperature of from about 170° C. to about 320° C. to form a film layer on the first nonwoven. The method can further include mixing the polymer with a corrosion inhibitor to produce the corrosion-inhibiting mixture. The method can further comprise the step of applying a second nonwoven to the film layer on the first nonwoven, which can occur while the film layer is molten.

The details of one or more embodiments of the invention are set forth in the description below. Other features, objects, and advantages will be apparent from the description and drawings, and from the claims.

DETAILED DESCRIPTION

Figure 1:
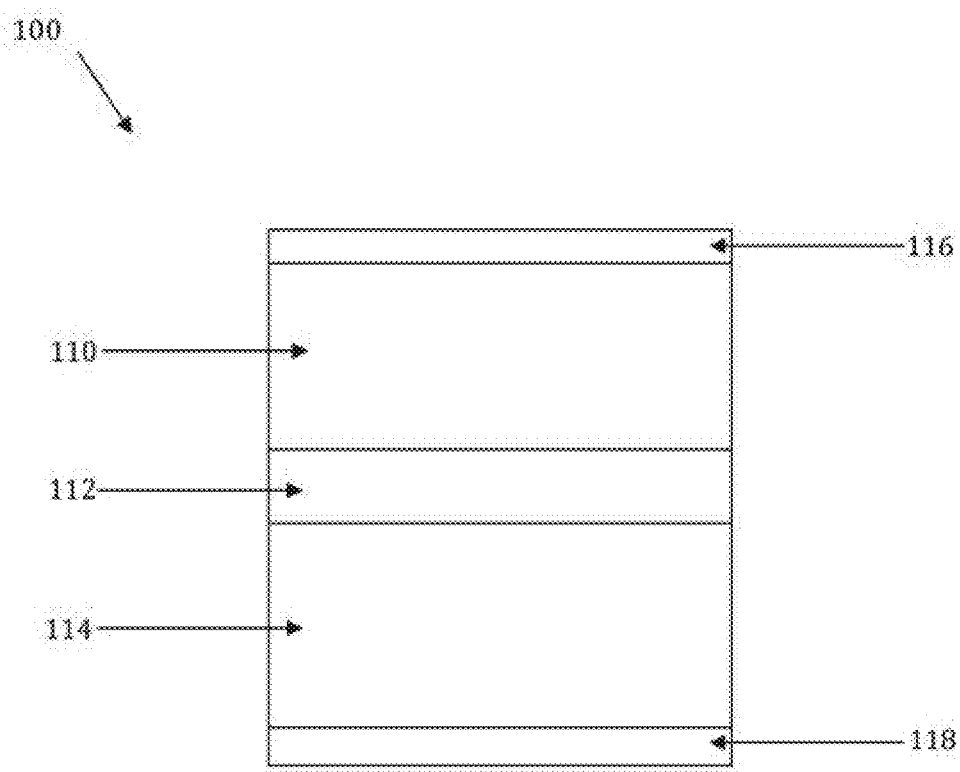
FIG. 1 depicts a cross-section of one embodiment of the invention of a composite disclosed herein.

Disclosed herein are composites that are vapor permeable, substantially water impermeable, and corrosion inhibiting. As depicted in FIG. 1, the composite 100 can comprise a first layer 110 comprising a first nonwoven adjacent to a second layer 112 comprising a polymer and a corrosion inhibitor. The second layer 112 can be mechanically integrated with the first layer, for example, through melt bonding. The second layer 112 can comprise a polymer and a corrosion inhibitor. In some embodiments of the invention, the composite 100 further comprises an optional third layer 114 adjacent to and mechanically integrated with the second layer 112, wherein the third layer 114 comprises a second nonwoven fabric. The composite 100 can further comprise an optional coating 116 on a surface of the first layer 110 and/or an optional coating 118 on the third layer 114.

First Layer comprising a First Nonwoven

The composites disclosed herein comprise a first layer comprising a first nonwoven. The first nonwoven can be formed from any suitable fibrous material that is compatible with the second layer comprising a polymer. For instance, the first nonwoven can be formed from any material capable of becoming mechanically integrated with the second layer. As used herein, the term "nonwoven" refers to a substrate containing one or more layers of fibers that are bonded together, but not in an identifiable manner as in a knitted or woven material.

The first nonwoven can be formed from any suitable polymer. In some embodiments of the invention, the polymer may include a polyolefin, a polyester, or a combination thereof. As used here, the term "polyolefin" refers to a homopolymer or a copolymer made from a linear or branched, cyclic or acyclic alkene. In some embodiments of the invention, the polyolefin can include polyethylene, polypropylene, polybutylene, a copolymer of ethylene, propylene and/or butylene, or a mixture thereof.

In some embodiments of the invention, the first nonwoven comprises a polyethylene. In some embodiments of the invention, the polyethylene includes low-density polyethylene (e.g., having a density from about 0.910 g/cm$^2$ to about 0.925 g/cm$^2$), linear low-density polyethylene (e.g., having a density from about 0.910 g/cm$^2$ to about 0.935 g/cm$^2$), or high-density polyethylene (e.g., having a density from about 0.935 g/cm$^2$ to about 0.970 g/cm$^2$). High-density polyethylene can be produced by copolymerizing ethylene with one or more $C_4$ to $C_{20}$ α-olefins. Examples of suitable α-olefins include 1-butene, 1-pentene, 4-methyl-1-pentene, 1-hexene, 1-octene, 1-decene, and combinations thereof. The high-density polyethylene can include up to about 20 mole percent of the above-mentioned α-olefin comonomers.

The first nonwoven can, in some embodiments of the invention, comprise a polyester. The polyester can include polyethylene terephthalate (PET), polybutylene terephthalate (PBT), polytrimethylene terephthalate (PTT), polyethylene naphthalate (PEN), polyglycolide or polyglycolic acid (PGA), potylactide or polylactic acid (PIA), polycaprolactone (PCL), polyethylene adipate (PEA), polyhydroxyalkanoate (PHA), or mixtures thereof.

In some embodiments of the invention, the first nonwoven comprises polypropylene. In some embodiments of the invention, the first nonwoven comprises polypropylene and one or more of the polyethylene polymers described above, wherein the polypropylene can be blended with one or more polyethylene polymers.

The first nonwoven can be formed from single component fibers, i.e., fibers containing a polymer having a single chemical structure (e.g., a polymer described in the preceding paragraph such as a polyethylene, a polypropylene, or a polyethylene terephthalate). In some embodiments of the invention, the first nonwoven can include single component fibers made from polymers having the same chemical structure but different characteristics (e.g., molecular weights, molecular weight distributions, density, or intrinsic viscosities). For example, the first nonwoven can include a mixture of a low-density polyethylene and a high-density polyethylene according to certain embodiments of the invention. Such fibers are still referred to as a single component fiber in this disclosure.

According to an embodiment of the invention, the first nonwoven may also be formed from multicomponent fibers, i.e., fibers containing polymers with different chemical structures (such as two different polymers described above). For example, the first nonwoven can be formed from a mixture of a polypropylene and a polyethylene terephthalate. In some embodiments of the invention, a multicomponent fiber can have a sheath-core configuration (e.g., having a polyethylene terephthalate as the core and a polypropylene as the sheath). In some embodiments of the invention, a multicomponent fiber may include two or more polymer domains in a different configuration (e.g., a side-by-side configuration, a pie configuration, or an "islands-in-the-sea" configuration).

The first nonwoven can be made by any method known in the art, such as a spunlacing, spunbonding meltblowing, carding, air-through bonding, or calendar bonding process. In some embodiments of the invention, the first nonwoven comprises a spunbond layer. In some embodiments, the spunbond layer comprises a plurality of continuous fibers, at least some (e.g., all) of which are bonded. The term "continuous fiber" mentioned herein refers to a fiber formed in a continuous process that is not shortened before it is incorporated into a nonwoven substrate containing the continuous fiber.

The spunbond layer may be manufactured according to the following process, for instance. After the polymer for making single component fibers is melted, the molten polymer can be extruded from an extruding device. The molten polymer can then be directed into a spinneret with composite spinning orifices and spun through this spinneret to form continuous fibers. The fibers can subsequently be quenched (e.g., by cool air), attenuated mechanically or pneumatically (e.g., by a high velocity fluid), and collected in a random arrangement on a surface of a collector (e.g., a moving substrate such as a moving wire or belt) to form a nonwoven web. In some embodiments, a plurality of spinnerets with different quenching and attenuating capability can be used to place one or more (e.g., two, three, four, or five) layers of fibers on a collector to form a spunbond substrate containing one or more layers of spunbonded fibers (e.g., an S, SS, or SSS type of substrate). In some embodiments of the invention, the first nonwoven comprises a spunbond polypropylene layer. In some embodiments, the nonwoven comprises a meltblown layer. For example, one or more layers of meltblown fibers may be inserted between the layers of the above-described spunbonded fibers to form a substrate containing both spunbonded and meltblown fibers SMS, SMMS, or SSMMS type of substrate).

A plurality of intermittent bonds may be formed between at least some of the fibers (e.g., all of the fibers) randomly disposed on the collector to form a unitary, coherent, nonwoven substrate according to certain embodiments of the invention. Intermittent bonds can be formed by a suitable method such as mechanical needling, thermal bonding, ultrasonic bonding, chemical bonding, or a combination thereof. Bonds can be covalent bonds (e.g., formed by chemical bonding), physical attachments (e.g., formed by thermal bonding), or a combination thereof. In some embodiments, intermittent bonds are formed by thermal bonding. For example, bonds can be formed by known thermal bonding techniques, such as point bonding (e.g., using calender rolls with a point bonding pattern) or area bonding (e.g., using smooth calender rolls without any pattern). In some embodiments, the fibers are area bonded or point bonded with each other through a plurality of intermittent bonds.

According to an embodiment of the invention, the first layer may have a basis weight of from of about 15 g/m$^2$ to about 120 g/m$^2$ as measured by ASIM D3776 (1996). In some embodiments, the first layer has a basis weight of about 15 g/m$^2$ or greater (e.g., about 20 g/m$^2$ or greater, about 25 g/m$^2$ or greater, about 30 g/m$^2$ or greater, about 35 g/m$^2$ or greater, about 40 g/m$^2$ or greater, about 45 g/m$^2$ or greater, about 50 g/m$^2$ or greater, about 55 g/m$^2$ about 60 g/m$^2$ or greater, about 70 g/m$^2$ or greater, about 80 g/m$^2$ or greater, about 90 g/m$^2$ greater, or about 100 g/m$^2$ or greater). In some embodiments of the invention, the first layer has a basis weight of from about 120 g/m$^2$ or less (e.g., about 110 g/m$^2$ or less, about 100 g/m$^2$ or less, about 90 g/m$^2$ or less, about 80 g/m$^2$ or less, about 70 g/m$^2$ or less, about 65 g/m$^2$ or less, about 60 g/m$^2$ or less, about 55 g/m$^2$ or less, about 50 g/m$^2$ or less, about 45 g/m$^2$ m or less, about 40 g/m$^2$ or less, about 35 g/m$^2$ or less, about 30 g/m$^2$ or less, about 25 g/m$^2$ m or less, or about 20 g/m$^2$ or less). In some embodiments, the first layer has a basis weight of from about 15 g/m$^2$ to about 120 g/m$^2$ (e.g., from about 20 g/m$^2$ to about 90 g/m$^2$, or from m about 25 g/m$^2$ to about 60 g/m$^2$.

Second Layer

In an embodiment of the invention, the composite comprises a second layer adjacent to and mechanically integrated with the first layer, the second layer comprising a polymer and a corrosion inhibitor. The polymer can be any polymer that can be extruded at a low temperature (e.g., about 400° C. or below) to minimize degradation of the corrosion inhibitor while still being capable of producing a breathable film. The polymer, in some embodiments of the invention, is not considered breathable on its own. In some embodiments, the polymer includes a polyolefin. The polyolefin can include any polyolefin described above as a polymer for use in the first nonwoven. In some embodiments, the polymer includes LDPE.

In some embodiments of the invention, the second layer can comprise an elastomer. The elastomer can be used alone or in combination with a polyolefin described above. Examples of suitable elastomers include vulcanized natural rubber, ethylene alpha olefin rubber (EPM), ethylene alpha olefin diene monomer rubber (EPDM), styrene-isoprene-styrene (SIS) copolymers, styrene-butadiene-styrene (SBS) copolymers, styrene-ethylene-butylene-styrene (SEBS) copolymers, ethylene-propylene (EP) copolymers, ethylene-vinyl acetate (EVA) copolymers, ethylene-maleic anhydride (EMA) copolymers, ethylene-acrylic acid (EEA) copolymers, and butyl rubber. A commercial example of such an elastomer is VERSIFY (i.e., an ethylene-propylene copolymer) available from Dow (Midland, Mich.). Without wishing to be bound by theory, it is believed that one advantage of using an elastomer in the second layer is that the composite containing such a film can have both improved tensile strength (e.g., by at least about 5% or at least about 10%) and improved elongation (e.g., by at least about 20% or at least about 50%).

In some embodiments of the invention, the second layer further includes a functionalized polyolefin (e.g., functionalized polyethylene or polypropylene), such as a functionalized polyolefin graft copolymers. Examples of such polyolefin graft copolymers include, but are not limited to, polypropylene-g-maleic anhydride and polymers formed by reacting PP-g-MAH with a polyetheramine. In some embodiments of the invention, such a functionalized polyolefin can be used with a compatibilizer to minimize the phase separation between the components the second layer or improve mechanical integration between the first and second layers (and/or between second layer and optional third layer). The compatibilizer may be from about 0.1% to about 30% (e.g., about 0.5% to about 15%, or about 1% to about 5%) of the total weight the second layer according to certain embodiments of the invention.

A commercially available polymer that can be used in the second layer includes, but is not limited to, VISTAMAXX™ 6202FL by EXXON, a propylene-based elastomer, VISTAMAXX™ 6202FL can be processed at temperatures of 400° C. or below, which, without intending to be bound by the theory, reduces thermal degradation of the corrosion inhibitor. VISTAMAXX™ 6202FL is also compatible with, for instance, a nonwoven comprising polypropylene because it can mechanically integrate with polypropylene nonwovens, even at the low extrusion temperatures described herein.

The polymer may have any melt flow index that allows the polymer to be fluid enough for extrusion at the extrusion temperatures described herein. In some embodiments, the polymer can have a melt flow index of about 10 g/10 mins to about 300 g/10 mins as measured by ASTM D1238-13. In some embodiments, the polymer has a melt flow index of about 10 g/10 mins or greater (e.g., about 15 g/10 mins or greater, about 20 g/10 mins or greater, about 25 g/10 mins or greater, about 30 g/10 mins or greater, about 40 g/10 mins or greater, about 60 g/10 mins or greater, about 80 g/10 mins or greater, about 100 g/10 mins or greater, about 120 g/10 mins or greater, about 140 g/10 mins or greater, about 160 g/10 mins or greater, about 180 g/10 mins or greater, about 200 g/10 mins or greater, or about 250 g/10 mins or greater). In some embodiments of the invention, the polymer has a melt flow index of about 300 g/10 mins or less (e.g., about 250 g/10 mins or less, about 200 g/10 mins or less, about 180 g/10 mins or less, about 160 g/10 mins or less, about 140 g/10 mins or less, about 120 g/10 mins or less, about 100 g/10 mins or less, about 80 g/10 mins or less, about 60 g/10 mins or less, about 40 g/10 mins or less, about 30 g/10 mins or less, about 25 g/10 mins or less, or about 20 g/10 mins or less). In some embodiments, the polymer has a melt flow index of from about 10 g/10 mins to about 300 g/10 mins (e.g., from about 20 g/10 mins to about 250 g/10 mins, from about 30 g/10 mins to about 200 g/10 mins, from about 40 g/10 mins to about 100 g/10 mins).

In some embodiments of the invention, in addition to a first polymer having the above-referenced melt flow index, the second layer can have a second polymer. The amount of the first polymer may be at least 50% by weight of the second layer according to certain embodiments of the invention. For example, the first polymer may be present in the second layer in an amount of from about 50% to about 99%, by weight of the second layer. In some embodiments of the invention, the first polymer is present in the second layer in an amount of about 50% or greater e.g., about 60% or greater, about 70% or greater, about 80% or greater, about 90% or greater, or about 95% or greater), by weight. In some embodiments of the invention, the first polymer is present in the second layer in an amount of about 99% or less (e.g., about 95% or less, about 90% or less, about 80% or less, about 70% or less, or about 60% or less), by weight.

The second layer may also comprise a corrosion inhibitor, according to certain embodiments of the invention. The corrosion inhibitor may comprise any compound that can enhance the corrosion inhibiting ability of the composite. The corrosion inhibitor may be a volatile corrosion inhibitor (WI). VCIs are volatile compounds that can emit ions that condense on metallic surfaces to form a mono-molecular layer that interacts with corrosion agents to protect the surface, VCIs may be continuously self-replenishing and environmentally benign. Examples of corrosion inhibitors include, but are not limited to, amine salts, nitrates of amine salts, benzoates of amine salts, triazole derivatives, alkali dibasic acid salts, alkali nitrites, tall oil imidazolines, alkali metal molybdates, or a combination thereof. In some embodiments, the corrosion inhibitor comprises ammonium benzoate, sodium molybdate, sodium nitrite, sodium erythorbate, benzotriazole, disodium sebacate, dicyclohexylammonium nitrite, potassium pyrophosphate; sodium benzoate, or a combination thereof. In some embodiments of the invention, the corrosion inhibitor comprises morpholine.

The second layer may further comprise a carrier for the corrosion inhibitor according to an embodiment of the invention. The carrier may be a porous material capable of remaining substantially nonvolatile at the processing temperatures described herein. In some embodiments, the carrier also acts as a desiccant. The carrier may be an inorganic carrier such as talc, silica, a clay such as kaolin, a solid flame retardant, diatomaceous earth, magnesium carbonate, barium carbonate, magnesium sulfate, calcium sulfate, aluminum hydroxide, zinc oxide, magnesium hydroxide, calcium oxide, magnesium oxide, alumina, mica, glass powder, ferrous hydroxide, zeolite, barium sulfate; or other mineral fillers, or mixtures thereof. In some embodiments, the carrier comprises acetyl salicylic acid, an ion exchange resin, wood pulp, pulp powder, borox, an alkaline earth metal, or a mixture thereof. In some embodiments, the carrier is silica. In some embodiments, the corrosion inhibitor is encapsulated in the carrier.

The corrosion inhibitor can be provided in the second layer in any amount sufficient o inhibit corrosion for the desired application. In some embodiments of the invention, the corrosion inhibitor is provided in the second layer in an amount to maximize corrosion inhibition in the desired application. In some embodiments of the invention, the corrosion inhibitor in the second layer is provided in an amount to minimize the toxicity of the corrosion inhibiting compound while maintaining the corrosion inhibiting properties for the desired application. In some embodiments of the invention, the corrosion inhibitor is present in the second layer in an amount of about 0.5% or greater (e.g., about 1% or greater, about 1.5% or greater, about 2% or greater, about 2.5% or greater, or about 3% or greater), by weight of the second layer. In some embodiments, the corrosion inhibitor is present in the second layer in an amount of about 5% or less (e.g., about 4.5% or less, about 4% or less, about 3.5% or less, about 3% or less, about 2.5% or less, about 2% or less, about 1.5% or less, or about 1% or less), by weight of the second layer. In some embodiments, the corrosion inhibitor is present in the second layer in an amount of from about 0.5% to about 3% (e.g., from about 0.75% to about 2.5%, or from about 1% to about 2%), by weight of the second layer. Without wishing to be bound to theory, it is believed that the corrosion inhibitor can bloom or migrate to a surface of the second layer as the second layer is heated (e.g., during extrusion), though the extrusion temperature can be selected to ensure that the corrosion inhibitor does not leave the second layer. Thus, in some embodiments of the invention, the second layer can have a concentration gradient whereby more of the corrosion inhibitor is present at an outer surface of the second layer that at the center of the second layer. In some embodiments of the invention, the corrosion inhibitor may also be present in the first layer.

In some embodiments of the invention, the corrosion inhibitor is present in a masterbatch containing the polymer, the carrier, and the corrosion inhibitor. The corrosion inhibitor can be compounded into the same base polymer (e.g., VISTAMAXX™ 6202FL), which by itself can give water barrier properties and which can adhere two nonwoven layers together. The combination of the polymer and corrosion inhibitor can impart corrosion protection and breathability to the composite. An example of a commercially available corrosion inhibitor masterbatch is SAM81720® (by STANDRIGE COLOR CORPORATION). SAM81720® contains 15% of CHEMSTAT® CI-1020 from PCC CHEMAX and 85% virgin VISTAMAXX™ 6202FL. CHEMSTAT® CI-1020 contains 60% antistat mixture and 40% synthetic amorphous silica dioxide hydrate. CHEMSTAT® CI-1020 also comprises ethoxylated tallow amine, diethanolamine, and less than 3% morpholine.

Third Layer

In some embodiments of the invention, the composite further may comprise a third layer adjacent to and mechanically integrated with the second layer, wherein the third layer comprises a second nonwoven. The second nonwoven may, independently, comprise any material discussed above with respect to the first nonwoven. For instance, the first nonwoven may be a polypropylene and the second nonwoven may be a polyethylene.

The second nonwoven may, independently, be of any basis weight described above for the first nonwoven. In some embodiments of the invention, the third layer is oriented in use to face a corrodible object in need of protection from, for instance, the environment. In some embodiments of the invention, the third layer has a lower basis weight than the first layer such that the second layer (with the corrosion inhibitor) can be closer to the corrodible object. For example, in some embodiments of the invention, the first layer can have a basis weight of 60 $g/m^2$ and the third layer can have a basis weight of 25 $g/m^2$.

Additives

In some embodiments of the invention, an effective amount of various additives can be incorporated into the first layer, the second layer, the third layer, or a combination thereof. Suitable additives include pigments, antistatic agents, antioxidants, ultraviolet light stabilizers, antiblocking agents, lubricants, processing aids, waxes, coupling agents for fillers, softening agents, thermal stabilizers, tackifiers, polymeric modifiers, hydrophobic compounds, hydrophilic compounds, anticorrosive agents, and mixtures thereof. In certain embodiments, additives such as polysiloxane fluids and fatty acid amides can be included to improve processability characteristics.

Pigments or dyes of various colors may be added to provide the resultant composite that is substantially opaque and exhibits uniform color. For example, the composite can have a sufficient amount of pigments or dyes to produce an opacity of at least about 85% (e.g., at least about 90%, at least about 95%, at least about 98%, or at least about 99%). Suitable pigments and dyes include, but are not limited to, antimony trioxide, azurite, barium borate, barium sulfate, cadmium pigments (e.g., cadmium sulfide), calcium chromate, calcium carbonate, carbon black, chromium(III) oxide, cobalt pigments (e.g., cobalt(II) aluminate), lead tetroxide, leadcte chromate, lithopone, orpiment, titanium dioxide, zinc oxide and zinc phosphate. Preferably, the pigment or dye includes titanium dioxide, carbon black, or calcium carbonate. The pigment or dye can be about 1 percent to about 20 percent (e.g., about 3 percent to about 10 percent) of the total weight of the first layer, the second layer, and/or the third layer.

In some embodiments of the invention, certain additives can be used to facilitate manufacture of the composite. For example, antistatic agents may be incorporated into the first layer, the second layer, and/or the third layer to facilitate processing of these materials. In addition, certain additives may be incorporated in the composite for specific end applications.

The first layer, second layer, and/or third layer may also include a filler, according to certain embodiments of the invention. The filler material may, for example, include any material described above as carriers for the corrosion inhibitor. The filler may be added in an amount of up to about 60 weight percent (e.g., from about 2 to about 50, from about 5 to about 40 or about 10 to about 30 weight percent) of the first layer the second layer, and/or the third layer.

Surface Treatments

In some embodiments of the invention, a surface of one or more of the first nonwoven and second nonwoven can include a coating such as a hydrophilic or a hydrophobic coating. In some embodiments of the invention, a surface of the first nonwoven includes a hydrophobic coating and a surface of the second nonwoven includes a hydrophilic coating. In some embodiments of the invention, only one of the first layer or third layer comprises a coating. In some embodiments of the invention, both the first layer and third layer comprise a coating, and the coating may be different according to certain embodiments or the coating may the same in certain other embodiments. The hydrophilic coating can include a surfactant to improve the hydrophilicity of the nonwoven and suitable surfactants include nonionic and anionic surfactants such as dioctyl sodium sulfosuccinate, sodium alkylarylpolyethersulfonate, and phospholipids. The hydrophobic coating can be applied to increase the barrier properties of the nonwoven and can include, for example, a silicone polymer. As shown in FIG. 1, the coating 116 or 118 on the nonwoven 112 or 114 is typically provided opposite the film layer 118.

The Composite

FIG. 1 depicts an exemplary embodiment of the invention showing the composite 100 comprising a first layer 110 having a first nonwoven adjacent to and mechanically integrated with a second layer 112 having a polymer and a corrosion inhibitor. In some embodiments of the invention, the composite 100 comprises a first layer 110 comprising a first nonwoven, and a second layer 112 adjacent to and mechanically integrated with the first layer, the second layer comprising a polymer and a corrosion inhibitor. In some embodiments, the composite 100 further comprises an optional third layer 114 adjacent to and mechanically integrated with the second layer 112, wherein the third layer 114 comprises a second nonwoven. The composite 100 can further comprise an optional coating 116 on a surface of the first layer 110 and/or an optional coating 118 on the third layer 114.

In some embodiments of the invention, the composite is substantially free of adhesives (wherein the second layer is not considered an adhesive in this sense). In some embodiments of the invention, the composite does not comprise an additional adhesive layer bonding the first layer to the second layer. In some embodiments of the invention, the composite does not comprise an additional adhesive layer bonding the second layer to the third layer. For instance, the first nonwoven and the second nonwoven can be melt bonded to the film layer. According to exemplary embodiments of the invention, the film layer may be extrusion laminated to the first nonwoven and the second nonwoven may be applied to the film layer while it is molten (or at least tacky) to produce the composite.

Method of Making the Composite

Also disclosed herein are methods of producing the composites disclosed herein. The method may include mixing a polymer with a corrosion inhibitor to produce a corrosion-inhibiting mixture, and extruding the corrosion-inhibiting mixture onto a surface of a first nonwoven to form a film layer on the first nonwoven. Without intending to be bound by the theory, higher extrusion temperatures may make these films more breathable, since higher extrusion temperatures cause off-gassing, which creates more pores and thus greater breathability. However, greater breathability may come at the expense of lower corrosion-inhibiting effectiveness, since the higher temperature may cause greater degradation of the corrosion inhibitor or cause the corrosion inhibitor to migrate out (i.e., flash off) of the composite. Accordingly, the inventor has discovered that the extrusion temperature should be low enough to avoid degrading the corrosion inhibitor. In some embodiments, the corrosion-inhibiting mixture is extruded onto the first nonwoven at an extrusion temperature of from about 170° C. to about 320° C. (e.g., from about 180° C. to about 280° C. or from about 185° C. to about 250° C.). The corrosion-inhibiting mixture can be extruded directly onto one or more nonwoven layers, allowing the corrosion-inhibiting mixture to mechanically wrap around the fibers of the one or more nonwoven layers such that the polymer layer is mechanically integrated with the one or more nonwoven layers in the finished composite. The method may further comprise adding a second nonwoven to the film layer of the first nonwoven, according to an embodiment of the invention. In some embodiments of the invention, the second nonwoven is added to the film layer while the film layer is still molten.

Figure 2:
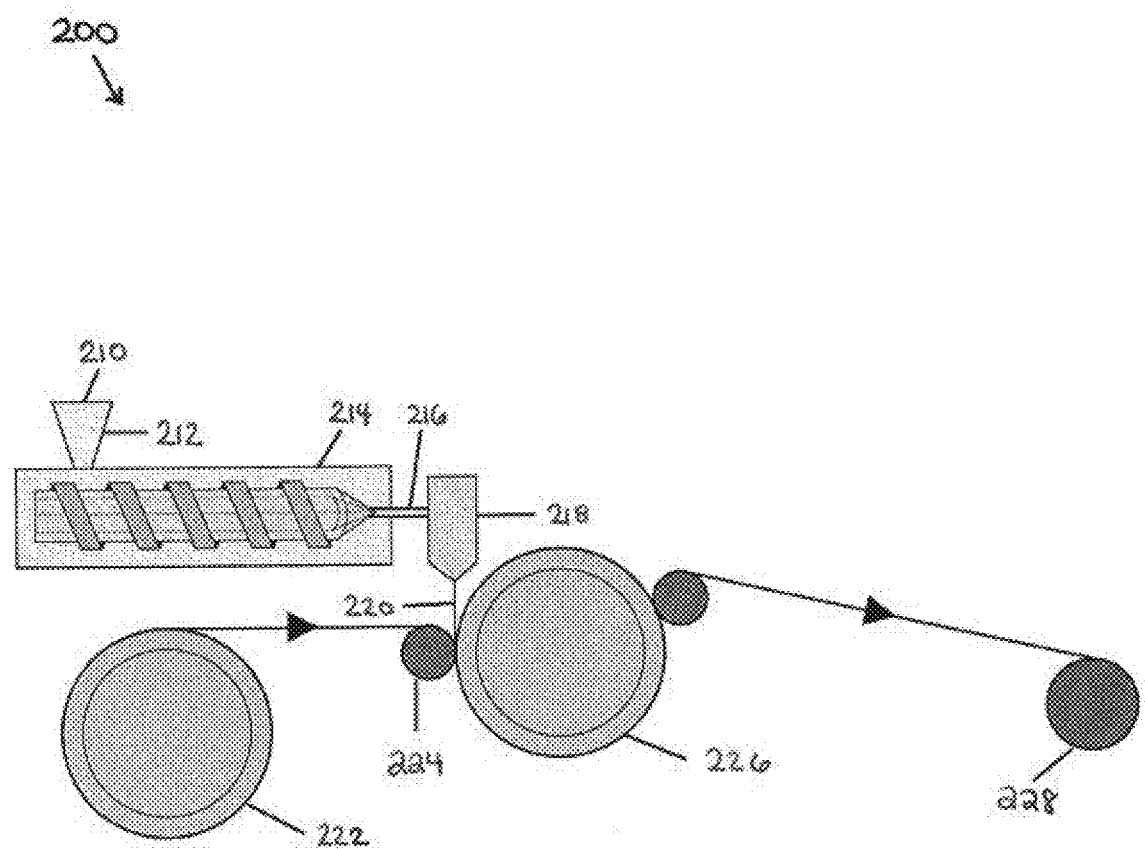
FIG. 2 depicts one embodiment of the invention of an apparatus for extruding a corrosion-inhibiting mixture onto a nonwoven.

FIG. 2 is a scheme illustrating an exemplary process for making a composite described using an extruder 200. As shown in FIG. 2, a corrosion-inhibiting mixture (comprising a polymer having a melt flow index of about 10 g/10 mins to about 200 g/10 mins and a corrosion inhibitor) can be fed into an inlet 210 of an extruder hopper 212. For example, masterbatch pellets including the polymer and the corrosion inhibitor and additional polymer pellets can be added via the extruder hopper 212. The composition can then be melted and mixed in a screw extruder 214. The molten mixture can be discharged from extruder 214 under pressure through a heated line 216 to a flat film die 218. Extrusion melt 220 discharging from the flat film die 218 can be coated on the first nonwoven from a roll 222. The coated substrate can then enter a nip formed between rolls 224 and 226, which can be maintained at a suitable temperature (e.g., from about 10° C. to about 120° C.). Passing the coated substrate through the nip formed between the cooled rolls 224 and 226 can quench the extrusion melt 220 while at the same time compressing the extrusion melt 220 so that it contacts and becomes mechanically integrated with the first nonwoven. In some embodiments of the invention, the roll 224 can be a smooth rubber roller with a low-stick surface coating while the roll 226 can be a metal roll. A textured embossing roll can be used to replace the metal roll 226 if a composite with a textured film layer is desired. When the extrusion melt 220 is cooled on the first nonwoven, it forms a composite having a corrosion-inhibiting mixture adjacent to and mechanically integrated with a first nonwoven. The composite thus formed can then be collected on a collection roll 228. In some embodiments of the invention, the surface of the nonwoven can be corona or plasma treated before it is coated with the extrusion melt 220 to improve the mechanical integration between the nonwoven and the corrosion-inhibiting mixture.

The composite formed above can then be stretched (e.g., incrementally stretched or locally stretched). Without wishing to be bound by theory, it is believed that stretching the composite can generate pores in the film layer that can enhance water vapor transmission. However, in some embodiments of the invention, the composite is not stretched, and is water-vapor permeable and substantially water-impermeable without stretching. The composite can be stretched (e.g., incrementally stretched) in the machine direction (MD) or the cross-machine direction (CD) or both (biaxially) either simultaneously or sequentially. As used herein, "machine direction" refers to the direction of movement of a nonwoven material during its production or processing. For example, the length of a nonwoven material can be the dimension in the machine direction. As used herein, "cross-machine direction" refers to the direction that is essentially perpendicular to the machine direction defined above. For example, the width of a nonwoven material can be the dimension in the cross-machine direction, Exemplary stretching methods include ring rolling (in the machine direction and/or the cross-machine direction), tentering, embossing, creping, and button-breaking.

In some embodiments of the invention, the composite can be stretched at an elevated temperature. The elevated temperature can be from about 50° C. to about 100° C. Stretching the composite at an elevated temperature can increase the MVTR by increasing the number of the pores, rather than the size of the pores (which can reduce the hydrostatic head (i.e., resistance of water) of the composite). As a result, it is believed that stretching the composite described above at an elevated temperature can improve the MVTR of the resultant composite while still maintaining an appropriate hydrostatic head of the composite.

Figure 3:
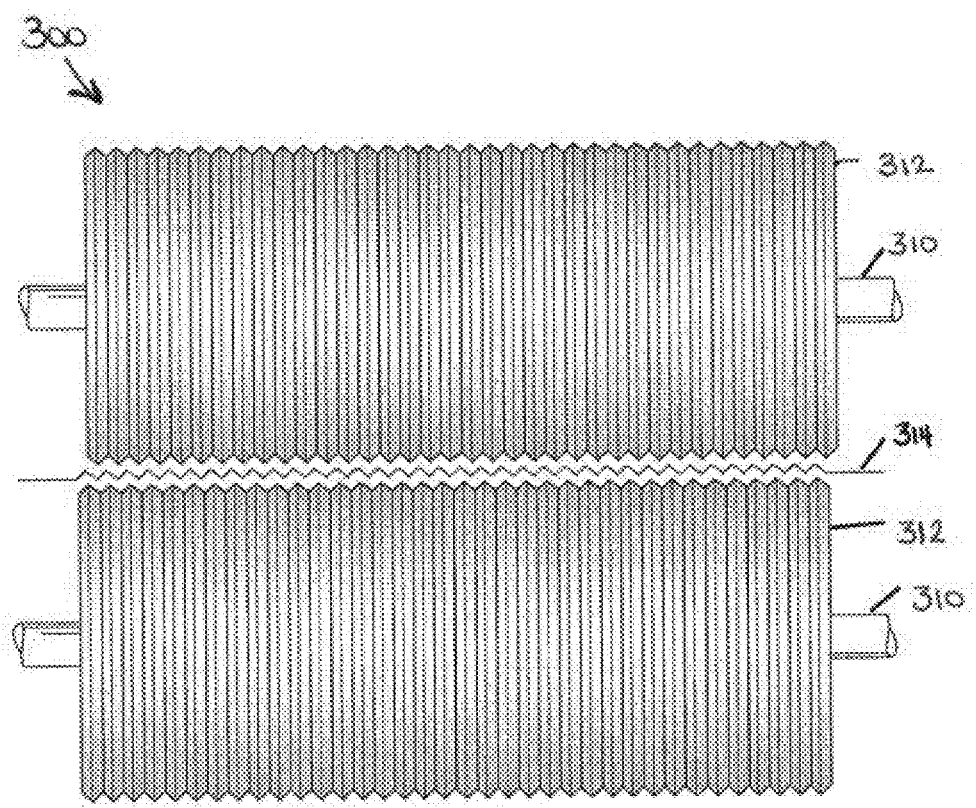
FIG. 3 depicts one embodiment of the invention of an apparatus for ring-rolling a composite disclosed herein.

FIG. 3 illustrates an exemplary ring-rolling apparatus 300 used to incrementally stretch the composite described above in the cross-machine direction. The apparatus 300 includes a pair of grooved rolls 310, each including a plurality of grooves 312. The grooves 312 stretch the composite described above. In some embodiments of the invention, one or both of the rolls 310 can be heated to an elevated temperature e.g., from about 50° C. to about 100° C.) by passing a hot liquid through rolls 310. The composite described above can also be incrementally stretched in the machine direction. It is contemplated that the composite can also be incrementally stretched using variations of the ring-rolling apparatus 300 and/or one or more other stretching apparatus known in the art.

In some embodiments of the invention, the composite described above can be e bossed before or after being stretched (e.g., by using a calendering process). For example, the composite can be embossed by passing it through a pair of calender rolls in which one roll has an embossed surface and the other roll has a smooth surface. Embossing may increase the surface area, which can facilitate vapor transmission through the composite. In some embodiments of the invention, at least one (e.g., both) of the calender rolls is heated, e.g., by circulating a hot fluid through the roll. In some embodiments of the invention, the composite is not embossed, and is vapor-permeable and substantially water-impermeable without embossing.

Uses for the Composite

The composites disclosed herein may be used in a variety of applications. For example, the composites disclosed herein can be used in any applications where providing corrosion protection to metal surfaces is beneficial. The composites can be used as indoor or outdoor protective covers. The composites may be used in, for instance, shipping, packing, and storing applications.

For instance, the composites disclosed herein may be used in coverings for furniture (e.g., seating such as chairs, umbrellas, tables, accessories), grills, vehicles (e.g., cars, trucks, vans, sports utility vehicles (SUVs), boats, recreation vehicles (RVs), all-terrain vehicles (ATVs), motorcycles, tractors, snowmobiles, utility vehicles for constructions sites, airplanes, helicopters, etc.), bicycles, or other objects exposed to outdoor elements. In some embodiments of the invention, the composite is used in an artillery covering (e.g., a gun covering) or other military/combat coverings (e.g., tank covering). The composites disclosed herein may also be used in shipping and/or packaging application. For example, the composites may be used for shipping and packaging of metal products that are susceptible to corrosion.

Composite Properties

The composite can have a variety of properties, including but not limited to being vapor permeable, substantially water impermeable, corrosion inhibiting, lightweight, drapable, ultraviolet (UV) resistant, or a combination thereof. For instance, composites disclosed herein may have one or more of the following non-limiting properties: (1) adequate water holdout to keep objects dry, (2) enough physical strength to withstand the rigors of outdoor and prolonged use (2 years), including UV resistance, (3) enough water vapor transport to allow covered moisture to escape when the composite is used to protect an object from corrosion, (4) a construction that allows it to be cut and sewn into articles for enclosing consumer products, (5) acceptable level of corrosion protection, and (6) the ability to be manufactured with normal extrusion coating equipment with normal levels of efficiency. Examples of properties of the composites disclosed herein are illustrated below.

Basis Weight

In some embodiments of the invention, the composite has a basis weight that balances the drapability/textile-like properties of the composite with the durability and corosion-inhibiting properties of the composite. In some embodiments of the invention, the composite may have a basis weight of about 45 g/m² or greater (e.g., about 50 g/m² or greater, about 60 g/m² or greater, about 70 g/m² or greater, about 80 g/m² or greater, about 90 g/m² or greater, about 100 g/m² or greater, about 110 g/m² or greater, about 120 g/m² or greater, about 130 g/m² or greater, about 140 g/m² or greater, about 150 g/m² or greater, about 175 g/m² or greater, about 200 g/m² or greater, about 225 g/m² or greater, or about 250 g/m² or greater). In some embodiments of the invention, the composite may have a basis weight of about 290 g/m² or less (e.g., about 250 g/m² or less, about 225 g/m² or less, about 200 g/m² or less, about 175 g/m² or less, about 150 g/m² or less, about 125 g/m² or less, about 100 g/m² or less, or about 80 g/m² or less). In some embodiments, the composite has a basis weight of from about 45 g/m² to about 290 g/m² (e.g., about 50 g/m² to about 250 g/m², about 70 g/m² to about 225 g/m², about 90 g/m² to about 200 g/m², about 100 g/m² to about 175 g/m², or about 105 g/m² to about 150 g/m²). Basis weight is determined herein by ASTM D3776 (1996).

Hydrostatic Head

In some embodiments of the invention, the composite may have a sufficient hydrostatic head value so as to maintain sufficient water impermeability. As used herein, the term "hydrostatic head" refers to the pressure of a column of water as measured by its height that is required to penetrate a given material and is determined according to AATCC 127 (1998), using the Textest FX3000 at 60 mbar/min for a 100 cm² sample. For example, the composite may have a hydrostatic head of about 20 cm or greater (e.g., about 25 cm or greater, about 30 cm or greater, about 35 cm or greater, about 40 cm or greater, or about 45 cm or greater). In some embodiments of the invention, the composite has a hydrostatic head of about 200 cm or less (e.g., about 180 cm or less, about 160 cm or less, about 140 cm or less, about 120 cm or less, or about 100 cm or less). In some embodiments, the composite has a hydrostatic head of from about 20 cm to about 200 cm (e.g., from about 25 cm to about 180 cm, from about 30 cm to about 160 cm, from about 35 cm to about 140 cm, from about 40 cm to about 120 cm, or from about 45 cm to about 100 cm).

Moisture-Vapor Transmission Rate (MVTR)

In some embodiments of the invention, the composite may have a suitable MVTR to maintain vapor permeability for its intended uses. As used herein, the MVTR values are measured according to ASTM E96-B (2005) at 23° C. and 50% relative humidity (RH). For example, the composite may have an MVTR of about 25 g/m²/day or greater (e.g., about 50 g/m²/day or greater, about 75 g/m²/day or greater, about 100 g/m²/day or greater, about 125 g/m²/day or greater, about 150 g/m²/day or greater, about 175 g/m²/day or greater, or about 200 g/m²/day or greater). In some embodiments, the composite can have an MVTR of about 1000 g/m²/day or less (e.g., about 900 g/m²/day or less, about 800 g/m²/day or less, about 700 g/m²/day or less, about 650 g/m²/day or less, about 600 g/m²/day or less, about 550 g/m²/day or less, about 500 g/m²/day or less, about 450 g/m²/day or less, about 400 g/m²/day or less, or about 350 g/m²/day or less) when measured at 23° C. and 50 RH %. For instance, the composite can have a MVTR of from about 25 g/m²/day and about 1000 g/m²/day (e.g., from about 50 g/m²/day and about 500 g/m²/day). Lower film weights, for instance, can produce higher MVTR values.

Accelerated Environmental Exposure (OUV)

In certain preferred embodiments of the invention, the composite will be resistant to ultraviolet radiation. The composite's resistance to ultraviolet radiation is shown by QUV testing via ASTM G154-12a after 576 hours of exposure. The QIN test chamber used to evaluate ultraviolet radiation resistance of materials, may also be used to determine how well fabric composites can prevent and inhibit the formation of rust or corrosion on standard steel test plates, Grab Tensile Strength In some embodiments of the invention, the composite has a sufficient tensile strength in the machine direction and/or the cross-machine direction for the desired application. The grab tensile strength is determined by measuring the tensile force required to rupture a sample of a sheet material. The tensile strength mentioned herein is measured according to ASTM D5034 (1995) and is reported in pounds force. In some embodiments of the invention, the composite may have an initial tensile strength (prior to environmental or QUV exposure) of at least about 80 pounds force and/or at most about 150 pounds force in the machine direction. In some embodiments of the invention, the composite may have an initial tensile strength of at least about 60 pounds force and/or at most about 100 pounds force in the cross-machine direction. In some embodiments of the invention, the composite can have an grab tensile strength in the machine and/or cross-machine direction after QUV exposure of 576 hours of at least about 75% of the value prior to QUV exposure (e.g., at least about 80% or at least about 85%).

Elongation

In some embodiments of the invention, the composite has a sufficient elongation in the machine direction and/or the cross-machine direction, Elongation is a measure of the amount that a sample of a sheet material will stretch under tension before the sheet breaks, and is measured according to ASTM D5034 (1995). The term "elongation" used herein refers to the difference between the length just prior to breaking and the original sample length, and is expressed as a percentage of the original sample length. For example, the composite may have an initial elongation (prior to environmental or QUV exposure) of at least about 110% and/or at most about 150% in the machine direction. For example, the composite can have an initial elongation of at least about 120% and/or at most about 200% in the cross-machine direction. In some embodiments of the invention, the composite may have an elongation in the machine and/or cross-machine direction after QUV exposure of 576 hours of at least about 40% of the value prior to QUV exposure (e.g., at least about 50% or at least about 60%).

Ball Burst

In some embodiments of the invention, the composite has a sufficient ball bursting strength for the intended material. Ball burst strength is a determination of the force required to rupture textile fabric by forcing a steel ball through the fabric and is measured according to ASTM D3787 (2011). In some embodiments of the invention, the composite may have a ball burst strength of about 50 pounds force or greater. In some embodiments of the invention, the composite may have a ball burst strength of about 70 pounds force or less.

Trapezoidal Tear Strength

In some embodiments of the invention, the composite has a trapezoidal tear strength in the machine direction and cross-machine direction for the intended material. Trapezoidal tear strength is a measure of the tearing strength of a nonwoven fabric by the trapezoid procedure using a recording constant-rate-of-extension (CRE) tensile testing machine and is measured according to ASTM D5733 (1995). In some embodiments of the invention, the composite may have an initial trapezoidal tear strength (prior to environmental or QUV exposure) of about 18 pounds force or greater and an initial trapezoidal tear strength of about 35 pounds force or less, in the machine direction. In some embodiments of the invention, the composite may have an initial trapezoidal tear strength (prior to environmental or QUV exposure) of about 20 pounds force or greater and an initial trapezoidal tear strength of about 40 pounds force or less, in the cross-machine direction. In some embodiments of the invention, the composite may have a trapezoidal tear strength in the machine and/or cross-machine direction after QUV exposure of 576 hours of at least about 25% of the value prior to QUV exposure (e.g., at least about 30% or at least about 35%)

Corrosion Inhibition Testing (Jar Test)

In preferred embodiments of the invention, the composites disclosed herein are corrosion inhibiting, as determined by the Jar Test. The Jar Test can determine the corrosion inhibition of a polymer treated with a corrosion inhibitor. The Jar Test can also be used to determine the effect of the corrosion inhibitor in the polymer on soft metals such as steel, aluminum, and copper. The procedure for conducting the Jar Test is below.

First, n panels of the appropriate metal are prepared, wherein n is the number of panels tested (e.g., n=3). For steel panels, the panels should be wiped with DI water using a paper towel, and then dried with a paper towel. For aluminum panels, the test panel should be sanded on both sides, and then rinsed with isopropyl alcohol and allowed to air dry. For copper panels, the panel should be cleaned to remove any material from the surface, and then rinsed with isopropyl alcohol and allowed to dry.

Next, a sample of the polymer of roughly the same size as the test panel is attached to one side of the panel by magnets. A magnet is placed between the panel and the polymer so that the two are not in contact with one another. At least one blank needs to be included for each metal type being tested. The blank should use a polymer without a corrosion inhibitor present. The panel with the polymer attached is then suspended in the test chamber and allowed to age for 24 hours. After the 24 hour aging period, 20 milliliters of DI water is added and the test chamber is resealed and allowed to equilibrate for 2 hours. After the equilibration period, the test chamber is placed into a water bath set at 50° C. for two hours.

The test panels should be marked so that the sides with the polymer attached can be compared, and the sides opposite the polymer can be compared. If the control panels do not show significant rust on the side opposite the polymer, the test should be rerun.

Corrosion Optical Density

Corrosion optical density, or optical density of corrosion on a panel may be determined by opening a panel image in Photoshop; selecting a color range in the color spectrum of the corrosion (for example, RGB values of about 126-105-55); creating a new layer via copy; converting the new layer to greyscale with color presets of red 40, yellow 60, green 40, cyan 60, blues 20, and magenta 80; and using the histogram to identify the mean color density of the panel to estimate the optical density of corrosion on the panel. A lower optical density is representative of a greater extent of corrosion while a relatively higher optical density is representative of a lesser extent of corrosion.

EXAMPLES

Example 1

A composite comprising two nonwoven layers and one intermediate polymer film layer was prepared. The first nonwoven layer was a 60 g/m² polypropylene spunbond nonwoven with high ultraviolet (UV) resistance extrusion laminated together with a 38 g/m² film layer that was applied at a temperature of 204° C. The film included 88 wt % virgin VISTAMAXX™ 6202FL, 12 wt % of STANDRIGE COLOR CORPORATION'S SAM81720 (which comprises 15 wt % volatile corrosion inhibitor masterbatch from PCC CHEMAX's CHEMSTAT® CI-1020 and 85 wt % virgin VISTAMAXX™ 6202FL). A second nonwoven layer was applied to the film layer while it was still molten and was a 25 g/m² polypropylene spunbond nonwoven treated with a hydrophilic spin finish. The second nonwoven layer was applied with the hydrophilic finish applied opposite the film layer.

Example 2

A composite was prepared in the same manner as Example 1 with the first nonwoven being a 60 g/m² polypropylene hydrophobic highly ultraviolet (UV) stabilized spunbond nonwoven, the film being a 40 g/m² film layer and the second nonwoven being a 25 g/m² polypropylene spunbond nonwoven. The film layer was formed from 90% of a low-density polyethylene (having a melt index of 200) and 10% of a volatile corrosion inhibitor masterbatch. The volatile corrosion inhibitor masterbatch contained 15 wt % of CHEMSTAT CI-1020, which is a composition of amines and silica, with morpholine as the primary active ingredient, and 85 wt % of VISTAMAXX™ 6202, a propylene-based elastomer.

Example 3

Three samples were prepared using a 60 gsm PPSB (polypropylene spunbond), dark gray nonwoven as the first nonwoven and a 30 gsm PPSB, light green nonwoven with a hydrophilic finish applied as the second nonwoven. The film was applied at about 235° C. The VCI masterbatch used was Standridge SAM 81720 with VISTAMAXX™ 6202 used as the remaining polymer. The composite varied as shown below.

Sample A: 30 gsm film with 4 wt % VCI masterbatch.

Sample 30 gsm film with 8 wt % VCI masterbatch.

Sample C: 20 gsm film with 8 wt % VCI masterbatch.

The basis weight and MVTR of the samples were determined and the results are provided in Table 1.

TABLE 1

| Sample | Basis Weight (g/m²) | MVTR (g/m²/24 hours) |
|---|---|---|
| A | 126.87 | 467.74 |
| B | 128.68 | 447.32 |
| C | 121.49 | 584.20 |

The lighter weight film provided a higher MVTR value than the two heavier films.

The corrosion-inhibiting effectiveness of the samples was then tested in accordance with the Jar Test described above. For each sample, three corrosion panel weights (g) were tested, and the corrosion level was listed (e.g., none, slight, medium, heavy).

The results of the Jar Test showing the corrosion for the three test panels of Sample A are below in Table 2, and depicted in FIG. 4.

TABLE 2

| Sample A | Corrosion Test Panel Weight (g) | Corrosion Level |
|---|---|---|
| n1 | 0.550 | Heavy |
| n2 | 0.513 | Heavy |
| n3 | 0.537 | Slight |

The results of the Jar Test for the three test panels of Sample B are below in Table 3, and depicted in FIG. 5.

TABLE 3

| Sample B | Corrosion Test Panel Weight (g) | Corrosion Level |
|---|---|---|
| n1 | 0.570 | Slight |
| n2 | 0.573 | Heavy |
| n3 | 0.567 | Slight |

The results of the Jar Test for the three test panels of Sample C are below in Table 4, and depicted in FIG. 6.

TABLE 4

| Sample C | Corrosion Test Panel Weight (g) | Corrosion Level |
|---|---|---|
| n1 | 0.528 | Slight |
| n2 | 0.527 | None |
| n3 | 0.534 | Slight |

The example demonstrated that higher breathability results from using higher extrusion temperatures, as well as producing a composite with good corrosion protection. These results are confirmed by the corrosion optical densities of these samples shown in Table 5.

TABLE 5

Figure 4:
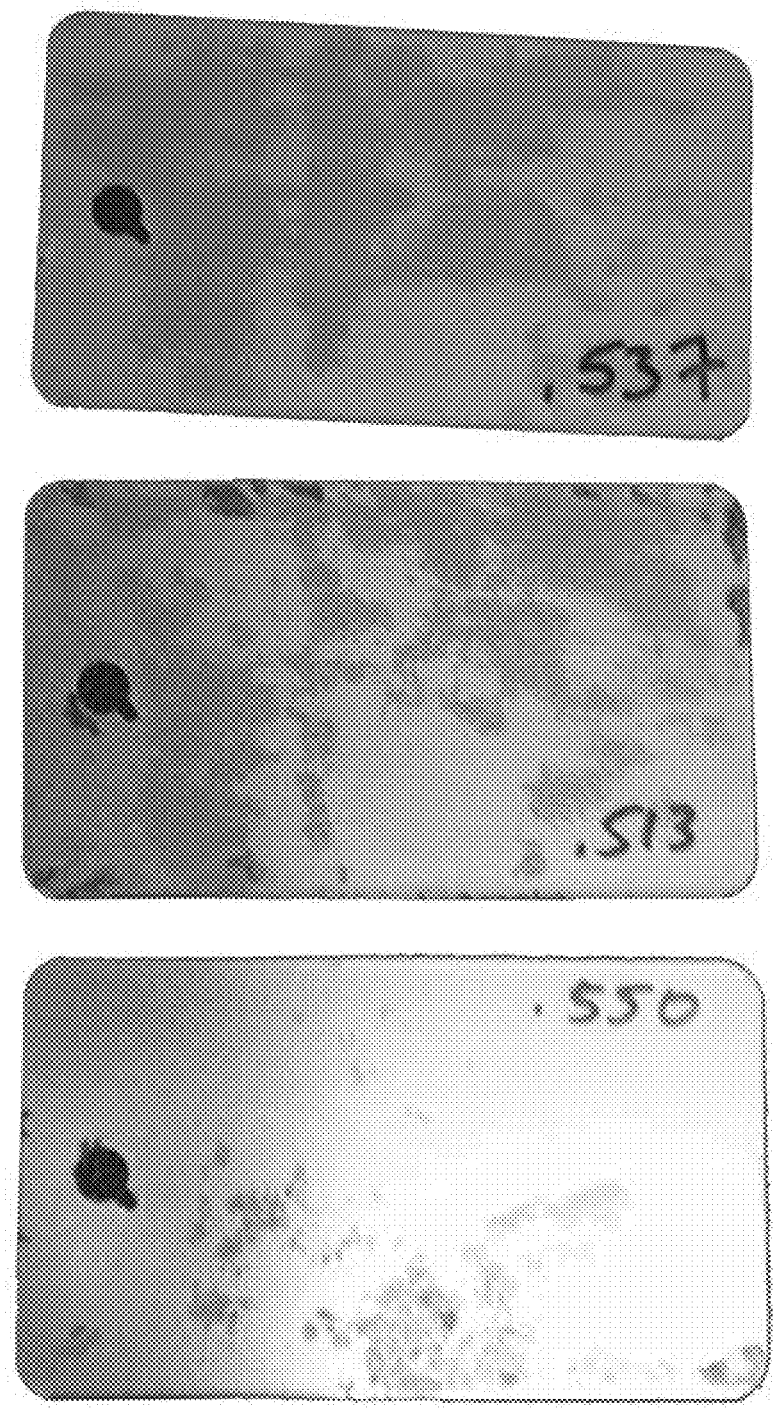
FIG. 4 shows results of a corrosion inhibition of Sample A conducted on three panels as described in Example 3.
Figure 5:
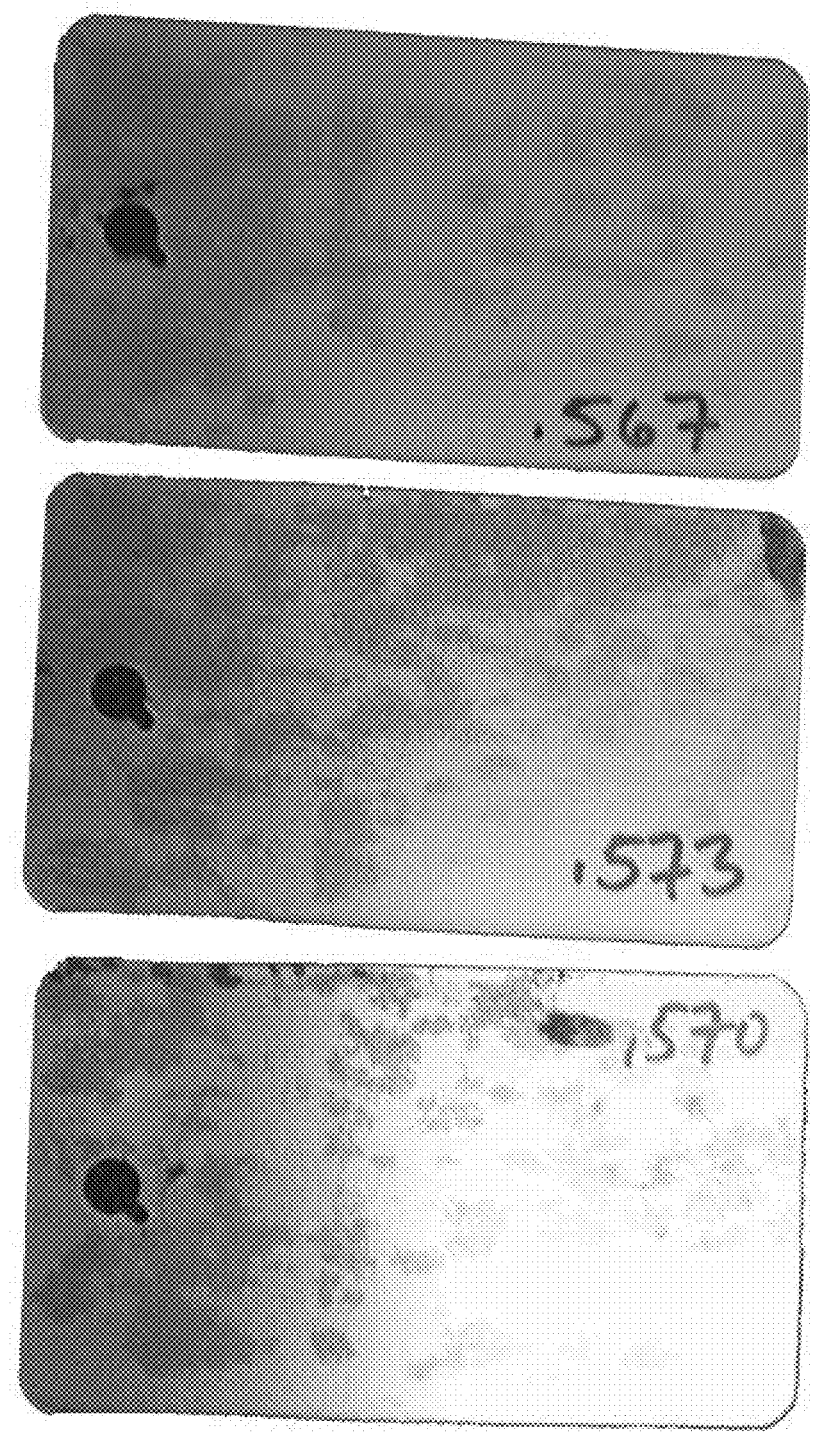
FIG. 5 shows results of a corrosion inhibition of Sample B conducted on three panels as described in Example 3.
Figure 6:
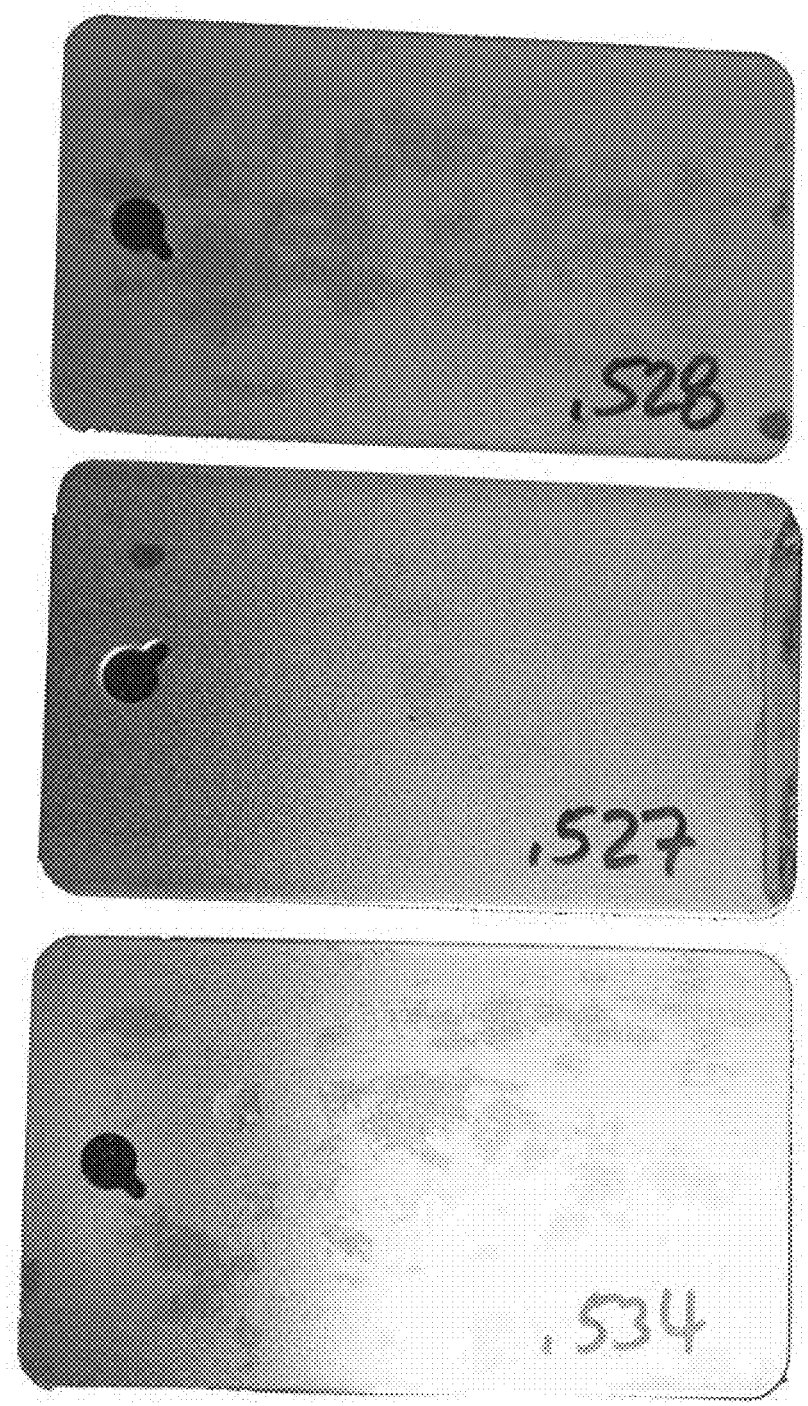
FIG. 6 shows results of a corrosion inhibition of Sample C conducted on three panels as described in Example 3.

| | Corrosion Optical Density | | |
|---|---|---|---|
| | Sample A FIG. 4 | Sample B FIG. 5 | Sample C FIG. 6 |
| n1 | 118 | 113 | 114 |
| n2 | 141 | 135 | 136 |
| n3 | 172 | 138 | 165 |
| Average | 140 | 128 | 136 |

Example 4

Five samples were prepared using an 80 gsm PPSB (polypropylene spunbond), dark gray nonwoven as the first nonwoven and a 30 gsm PPSB, light green nonwoven with a hydrophilic finish applied as the second nonwoven. The film was applied at about 220° C. The VCI masterbatch used was Standridge SAM 81720 with VISTAMAXX™ 6202 used as the remaining polymer. The composite varied as shown below.
  Sample D: 40 gsm film with 10 wt % masterbatch.
  Sample E: 40 gsm film with 12 wt % VCI masterbatch.
  Sample F: 50 gsm film with 12 wt % VCI masterbatch.
  Sample G: 60 gsm film with 12 wt % VCI masterbatch.
  Sample H: 40 gsm film with 14 wt % VCI masterbatch.

The samples were tested to assess the performance of composites having various corrosion-inhibiting masterbatch amounts. The basis weight and MVTR of the samples were determined. The results are in Table 6.

TABLE 6

| Sample | Basis Weight (g/m$^2$) | MVTR (g/24 hours) |
|---|---|---|
| D | 149.88 | — |
| E | 161.40 | 119.99 |
| F | 166.09 | 114.83 |
| G | 176.14 | 113.36 |
| H | 157.32 | — |

As shown in this example, increasing the film weights of VCI, at least with this recipe, did not show an appreciable change in MVTR. However, the use of a heavier first nonwoven, 80 gsm versus 60 gsm as used in Example 3, does show how the total sample weight can impact MVTR.

The results of the Jar Test showing the corrosion for the three test panels of Sample D are below in Table 7.

TABLE 7

| Sample D | Corrosion Test Panel Weight (g) | Corrosion Level |
|---|---|---|
| n1 | 0.639 | Slight |
| n2 | 0.708 | Slight |
| n3 | 0.663 | None |
| Average: | 0.670 | N/A |

The results of the Jar Test showing the corrosion for the three test panels of Sample E are below in Table 8.

TABLE 8

| Sample E | Corrosion Test Panel Weight (g) | Corrosion Level |
|---|---|---|
| n1 | 0.650 | None |
| n2 | 0.649 | Medium |
| n3 | 0.652 | None |
| Average: | 0.650 | N/A |

The three test panels for Sample F were not subjected to a Jar Test.

The results of the Jar Test showing the corrosion for the three test panels of Sample G are below in Table 9.

TABLE 9

| Sample G | Corrosion Test Panel Weight (g) | Corrosion Level |
|---|---|---|
| n1 | 0.674 | Slight |
| n2 | 0.723 | None |
| n3 | 0.724 | None |
| Average: | 0.707 | N/A |

The results of the Jar Test showing the corrosion for the three test panels of Sample are below in Table 10.

TABLE 10

| Sample H | Corrosion Test Panel Weight (g) | Corrosion Level |
|---|---|---|
| n1 | 0.628 | None |
| n2 | 0.660 | Slight |
| n3 | 0.655 | None |
| Average: | 0.648 | N/A |

This example was designed to investigate the processability of producing a film with higher and higher levels of VCI masterbatch. The corrosion protection was good at all additive levels and film weights; however, the sample using 14 wt % masterbatch (Sample H) began to lose integrity.

TABLE 11

| Property Tested | Value |
| --- | --- |
| Basis Weight | 123 g/m² |
| Hydrostatic Head | 27.66 cm |
| MVTR | 190.89 g/24 hours |
| Grab Tensile Strength-Break (MD[1]) | 88.90 lbf |
| Grab Tensile Strength-Elongation (MD) | 135.56% |
| Grab Tensile Strength-Break (XD[2]) | 72.31 lbf |
| Grab Tensile Strength-Elongation (XD) | 151.72% |
| Trapezoid Tear Strength-Maximum Break (MD) | 23.69 lbf |
| Trapezoid Tear Strength-Maximum Break (XD) | 27.77 lbf |
| Ball Bursting Strength | 59.12 lbf |

[1]Machine Direction

[2]Cross-Machine Direction

Example 5

A sample (Sample I) was prepared in the same manner as Example 1 except that the film was 40 gsm instead of 38 gsm and was extruded at 218° C. Various properties of the sample were tested, including basis weight, hydrostatic head, moisture-vapor transmission rate, grab tensile strength, trapezoidal tear strength, and ball burst strength. The results of those tests are shown in Table 11. The results of the Jar Test showing the corrosion for the three test panels of Sample I are below in Table 12, and depicted in FIG. 7.

TABLE 12

| Sample I | Corrosion Test Panel Weight (g) | Corrosion Level |
| --- | --- | --- |
| n1 | 0.512 | Moderate |
| n2 | 0.473 | Moderate |
| n3 | 0.509 | Moderate |
| Average: | 0.498 | N/A |

Example 6

A sample (Sample J) was prepared in the same manner as Example 5 except that it was extruded at 208° C. Various properties of the sample were then tested, including hydrostatic head, moisture-vapor transmission rate, and corrosion inhibition (Jar Test). The results of those tests are in Tables 13-15 below for the 3 test panels. Table 13 provides the moisture-vapor transmission rate of Sample J.

TABLE 13

| Property Tested | Value |
| --- | --- |
| MVTR | 53.8 g/m²/24 hours |

The reduction in extrusion temperature between Example 5 and Example 6 corresponds to the changes in hydrostatic head and MVTR values. Generally, the higher the extrusion temperature, the lower the hydrostatic head but the higher the MVTR.

Table 14 provides the hydrostatic head of Sample J, at 60 g/m2 side to column.

TABLE 14

| N | Initial (mbar) | Initial (cm) | After 288 hours (mbar) | After 288 hours (cm) | After 576 hours (mbar) | After 576 hours (cm) |
| --- | --- | --- | --- | --- | --- | --- |
| 1 | 93.5 | 95.4 | 87.5 | 89.3 | 61.5[3] | 62.7 |
| 2 | 108.0 | 110.2 | 103.0[3] | 105.1 | 69.5[3] | 70.9 |
| 3 | 143.0[3] | 145.9 | 69.0[3] | 70.4 | 48.0[3] | 49.0 |
| Average | 114.8 | 117.1 | 86.5 | 88.2 | 59.7 | 60.9 |

[3]Sample leaked between layers

The results of the Jar Test showing the corrosion for the three test panels of Sample J are below in Table 15, and depicted in FIG. 8.

TABLE 15

| Sample J | Corrosion Level |
| --- | --- |
| n1 | Slight |
| n2 | Slight |
| n3 | Slight |

The comparative corrosion optical densities for the test panels of Sample I and Sample J are provided in Table 16.

TABLE 16

Figure 7:
FIG. 7 shows results of a corrosion inhibition of Sample I conducted on three panels as described in Example 5.
Figure 8:
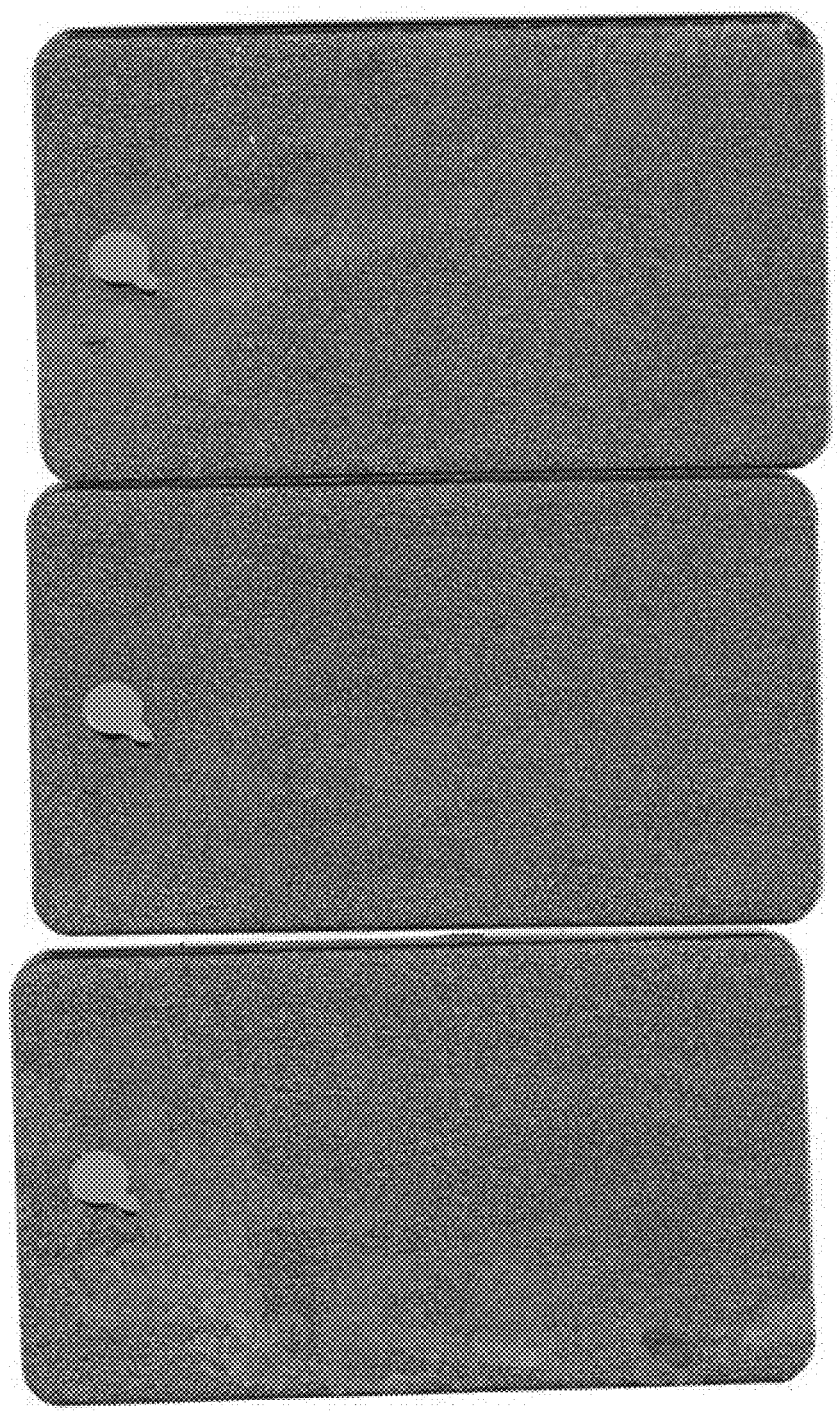
FIG. 8 shows results of a corrosion inhibition of Sample J conducted on three panels as described in Example 6.

| | Corrosion Optical Density | |
| --- | --- | --- |
| | Sample I FIG. 7 | Sample J FIG. 8 |
| n1 | 132 | 96 |
| n2 | 151 | 96 |
| n3 | 185 | 95 |
| Average | 156 | 96 |

Example 7

One sample (Sample K) was prepared in the same manner as Example 1, except that a 40 g/m² film layer was applied at a melt temperature below 200° C., the film including 88% 200 MI LDPE (low density polyethylene) and 12% of SAM81720. Sample K was tested for grab tensile strength (initial and QUV exposure 576 hours), trapezoidal tear strength (initial and QUV exposure 576 hours), and ball bursting strength. The results of those tests are shown in Tables 15-21 for 5 test panels. Table 17 shows initial grab tensile strength for the machine direction tests for Sample K.

TABLE 17

| Sample K | Initial Grab Tensile Strength-Max Load at Break (lbf) (Machine Direction) | Initial Grab Tensile Strength-Elongation at Break (%) (Machine Direction) |
| --- | --- | --- |
| n1 | 97.52 | 140.95 |
| n2 | 91.39 | 122.41 |
| n3 | 102.07 | 159.08 |
| n4 | 94.52 | 132.95 |
| n5 | 100.70 | 144.15 |
| Average: | 97.24 | 139.91 |
| Maximum: | 102.07 | 159.08 |
| Minimum: | 91.39 | 122.41 |
| Standard Deviation: | 4.39 | 13.61 |

TABLE 18

| Sample K | QUV (576 Hours) Grab Tensile Strength-Max Load at Break (lbf) (Machine Direction) | QUV (576 Hours) Grab Tensile Strength-Elongation at Break (%) (Machine Direction) |
|---|---|---|
| n1 | 85.34 | 67.48 |
| n2 | 89.34 | 85.48 |
| n3 | 82.06 | 69.08 |
| n4 | 81.12 | 71.08 |
| n5 | 74.29 | 52.44 |
| Average: | 82.43 | 69.11 |
| Maximum: | 89.34 | 85.48 |
| Minimum: | 74.29 | 52.44 |
| Standard Deviation: | 5.58 | 11.75 |

Table 18 shows QUV grab tensile strength at 576 hours for the machine direction tests for Sample K. Table 19 shows initial grab tensile strength for the cross-machine direction tests for Sample K.

TABLE 19

| Sample K | Initial Grab Tensile Strength-Max Load at Break (lbf) (Cross-Machine Direction) | Initial Grab Tensile Strength-Elongation at Break (%) (Cross-Machine Direction) |
|---|---|---|
| n1 | 67.64 | 154.95 |
| n2 | 70.77 | 172.01 |
| n3 | 68.91 | 164.68 |
| n4 | 69.10 | 160.15 |
| n5 | 70.08 | 179.49 |
| Average: | 69.30 | 166.26 |
| Maximum: | 70.77 | 179.49 |
| Minimum: | 67.64 | 154.95 |
| Standard Deviation: | 1.20 | 9.69 |

Table 20 shows QUV grab tensile strength at 576 hours for the cross-machine direction tests for Sample K. Grab Tensile strength properties for maximum load at break changed 15.23% in the machine direction and 23% in the cross-machine direction from initial to QUV at 576 hours. Elongation changed at 50% in both the machine direction and cross-machine direction.

TABLE 20

| Sample K | QUV (576 Hours) Grab Tensile Strength-Max Load at Break (lbf) (Cross-Machine Direction) | QUV (576 Hours) Grab Tensile Strength-Elongation at Break (%) (Cross-Machine Direction) |
|---|---|---|
| n1 | 51.74 | 82.95 |
| n2 | 44.21 | 60.81 |
| n3 | 57.90 | 90.95 |
| n4 | 53.42 | 92.15 |
| n5 | 59.69 | 97.88 |
| Average: | 53.39 | 84.95 |
| Maximum: | 59.69 | 97.88 |
| Minimum: | 44.21 | 60.81 |
| Standard Deviation: | 6.06 | 14.51 |

Table 21 shows the initial trapezoidal tear strength test results for the machine direction and cross-machine direction for Sample K. Table 22 shows the QUV (at 576 hours) trapezoidal tear strength test results for the machine direction and cross-machine direction for Sample Trapezoid Tear strength in the initial analysis averaged 27.04 lbf in the machine direction and 30.93 lbf in the cross-machine direction. Trapezoidal tear strength maximum load for the 576 hour weathered sample decreased 44.9% in the machine direction and 73.5% in the cross-machine direction from the initial sample.

TABLE 21

| Sample K | Initial Trapezoidal Tear Strength-Max Load at Break (lbf) (Machine Direction) | Initial Trapezoidal Tear Strength-Max Load at Break (lbf) (Cross-Machine Direction) |
|---|---|---|
| n1 | 30.24 | 35.60 |
| n2 | 22.42 | 29.44 |
| n3 | 28.42 | 23.88 |
| n4 | 28.02 | 33.32 |
| n5 | 26.10 | 32.41 |
| Average: | 27.04 | 30.93 |
| Maximum: | 30.24 | 35.60 |
| Minimum: | 22.42 | 23.88 |
| Standard Deviation: | 2.97 | 4.52 |

TABLE 22

| Sample K | QUV (576 hours) Trapezoidal Tear Strength-Max Load at Break (lbf) (Machine Direction) | QUV (576 hours) Trapezoidal Tear Strength-Max Load at Break (lbf) (Cross-Machine Direction) |
|---|---|---|
| n1 | 10.37 | 8.02 |
| n2 | 8.19 | 5.88 |
| n3 | 4.64 | 7.39 |
| n4 | 10.04 | 10.14 |
| n5 | 6.29 | 9.58 |
| Average: | 7.91 | 8.20 |
| Maximum: | 10.37 | 10.14 |
| Minimum: | 4.64 | 5.88 |
| Standard Deviation: | 2.45 | 1.71 |

Table 23 shows ball burst strength test results for Sample K. Ball burst strength had a maximum load break average of 57.95 lbf.

TABLE 23

| Sample K | Ball Burst Strength-Max Peak Load (lbf) |
|---|---|
| n1 | 53.43 |
| n2 | 62.64 |
| n3 | 53.35 |
| n4 | 64.73 |
| n5 | 55.59 |
| Average: | 57.95 |
| Maximum: | 64.73 |
| Minimum: | 53.35 |
| Standard Deviation: | 5.37 |

The results confirmed that the physical properties of the composite continues to show very good results, before and after UV testing, even with a film recipe using LDPE instead of the VISTAMAXX™ 6202 when produced at commercial line speeds.

Example 8

Two samples Samples L and M) were prepared in the same manner as Example 7. Various properties of the samples were tested, including basis weight, hydrostatic head, moisture-vapor transmission rate, and ball bursting strength. The results of those tests are shown in Table 24.

TABLE 24

| Property Tested | Sample L | Sample M |
| --- | --- | --- |
| Basis Weight (osy) | 128.9 gsm | 127.5 gsm |
| Hydrostatic Head (cm) | 69.1 | 78.7 |
| MVTR (g/m²/24 hours) | 348.6 | 100.5 |
| Ball Bursting Strength (lbf) | 56.19 | 54.21 |

The results confirm good hydrostatic head and ball burst results as well as adequate MVTR using 200 MI LDPE.

The results of the Jar Test showing the corrosion for the three test panels of Sample L are below in Table 25, and depicted in FIG. 9.

TABLE 25

| Sample L | Corrosion Level |
| --- | --- |
| n1 | Slight |
| n2 | Slight |
| n3 | Slight |

The results of the Jar Test showing the corrosion for the three test panels of Sample M are below in Table 26, and depicted in FIG. 10.

TABLE 26

| Sample M | Corrosion Level |
| --- | --- |
| n1 | Slight |
| n2 | None |
| n3 | Moderate |

The comparative corrosion optical densities for the test panels of Sample L and Sample M are provided in Table 27.

TABLE 27

Figure 9:
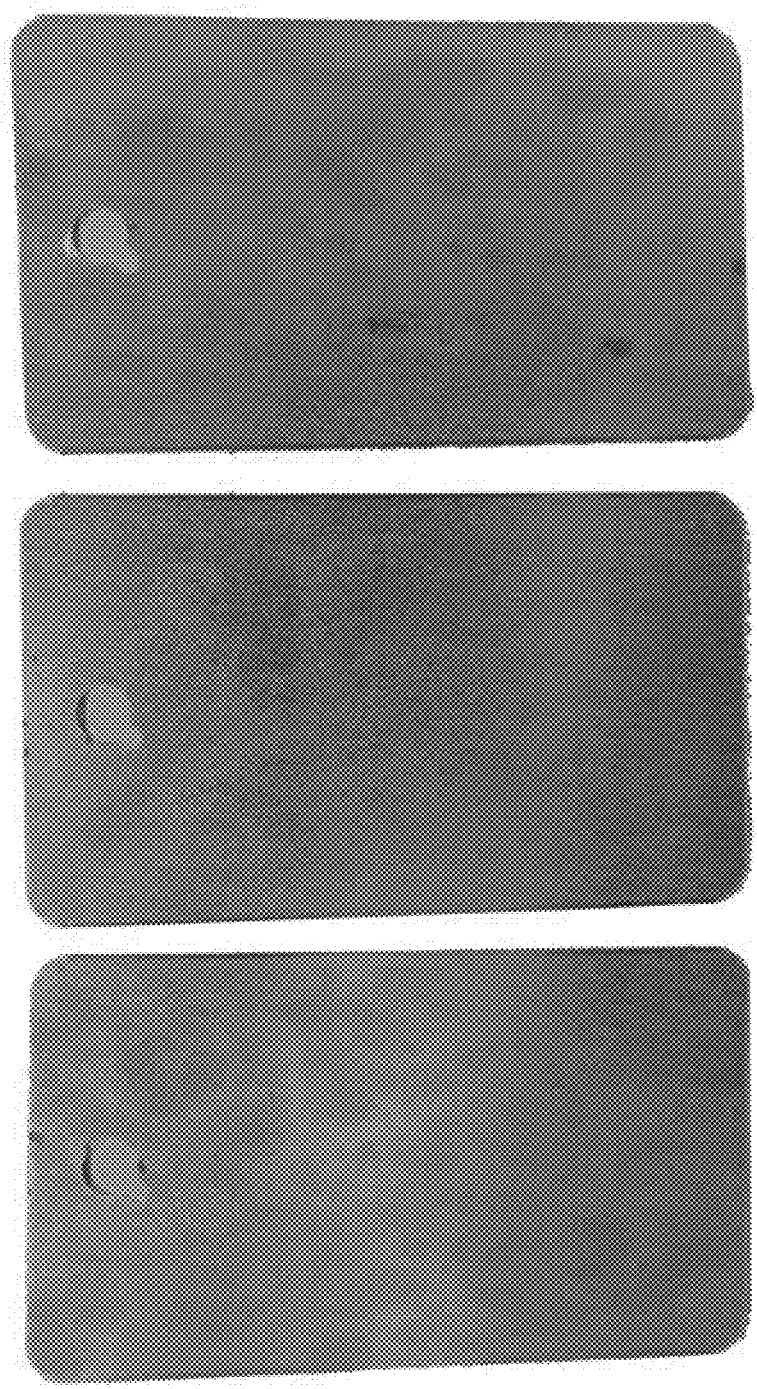
FIG. 9 shows results of a corrosion inhibition of Sample L conducted on three panels as described in Example 8.
Figure 10:
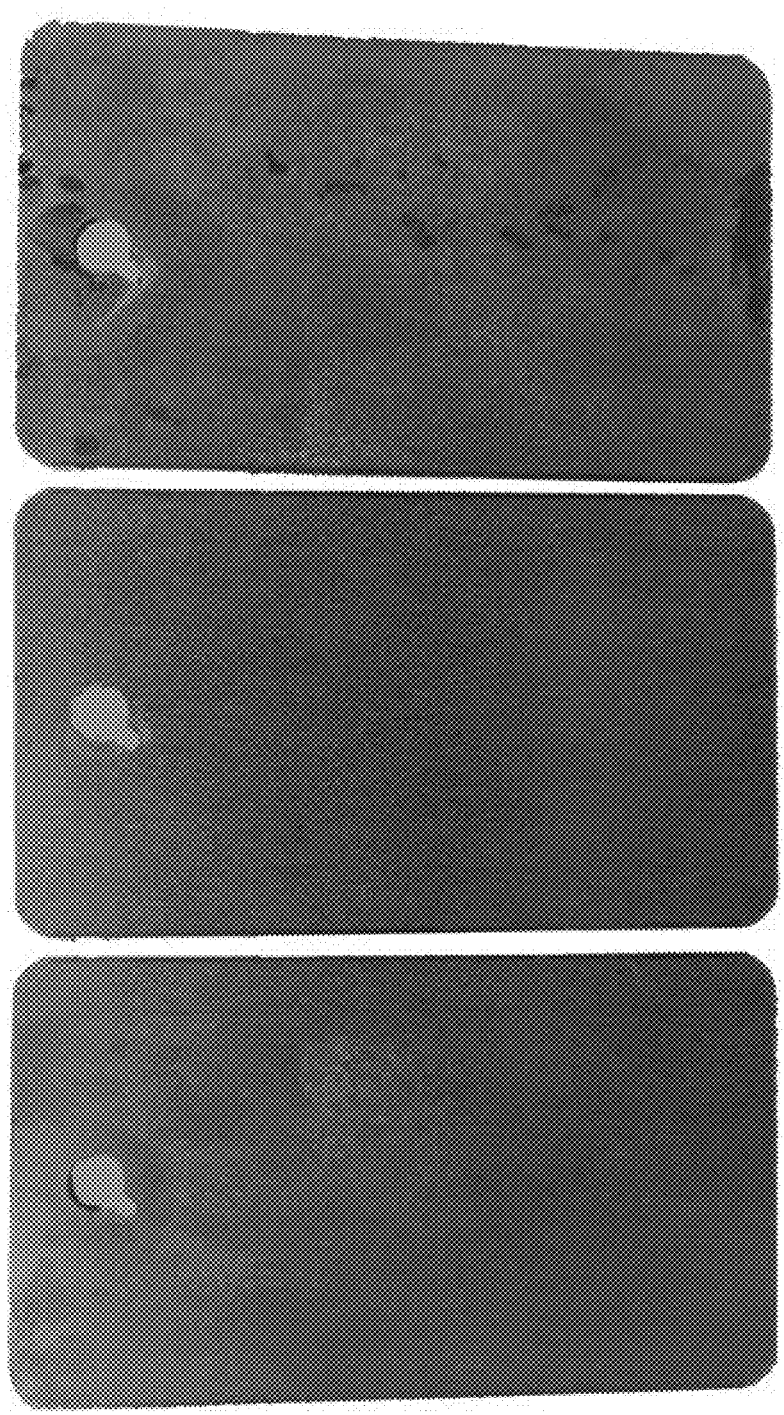
FIG. 10 shows results of a corrosion inhibition of Sample M conducted on three panels as described in Example 8.

| | Corrosion Optical Density | |
| --- | --- | --- |
| | Sample L FIG. 9 | Sample M FIG. 10 |
| n1 | 108 | 75 |
| n2 | 94 | 69 |
| n3 | 100 | 71 |
| Average | 101 | 72 |

Samples were similar in unit weight, hydrostatic head and ball burst strength. The MVTR of the samples varied, likely because of the variability of film thickness, variability of the distribution of the VCI compound, and the use of a small sample size.

Example 9

One sample (Sample N) was prepared in the same manner as Example 1, except the sample used a 20 g/m² film layer that was applied at a temperature of 255° C. and the second nonwoven had a basis weight 30 g/m². The film included 9 wt % VCI masterbatch produced by Phoenix Plastics, item #720N (this masterbatch used 15 wt % PCC CFLEMAX's CHEMSTAT® CI-1020 and 85 wt % IDPE), 46 wt % Dow 722 and 45 wt % VISTAMAXX™ 6202 FL. Various properties of the sample were then tested, including basis weight, hydrostatic head, moisture-vapor transmission rate, grab tensile strength, QUV accelerated weathering testing, trapezoidal tear strength, and ball bursting strength. The results are shown in Table 28.

TABLE 28

| Property Tested | Value |
| --- | --- |
| Basis Weight | 115.3 gsm |
| Hydrostatic Head | 61 cm |
| MVTR | 224.5 g/m²/24 hours |
| Initial Grab Tensile Strength-Break (MD[1]) | 90.4 lbf |
| Initial Grab Tensile Strength-Elongation (MD) | 129.7% |
| Initial Grab Tensile Strength-Break (XD[2]) | 66.2 lbf |
| Initial Grab Tensile Strength-Elongation (XD) | 155.8% |
| QUV (576 hours) Grab Tensile Strength-Break (MD) | 65.6 lbf |
| QUV (576 hours) Grab Tensile Strength-Elongation (MD) | 73.5% |
| QUV (576 hours) Grab Tensile Strength-Break (XD) | 43.7 lbf |
| QUV (576 hours) Grab Tensile Strength-Elongation (XD) | 80.1% |
| Initial Trapezoid Tear Strength-Maximum Break (MD) | 27.1 lbf |
| Initial Trapezoid Tear Strength-Maximum Break (XD) | 32.5 lbf |
| QUV (576 hours) Trapezoid Tear Strength-Maximum Break (MD) | 12.1 lbf |
| QUV (576 hours) Trapezoid Tear Strength-Maximum Break (XD) | 18.8 lbf |
| Ball Bursting Strength | 57.3 lbf |

[1]Machine Direction
[2]Cross-Machine Direction

Example 10

The purpose of the tests of this example is to evaluate ultraviolet radiation resistance of materials and to determine how well fabric composites can prevent and inhibit the formation of rust or corrosion on standard steel plates. The fabric test samples are prepared by creating a pocket or sleeve sized to hold the steel test plate. The fabric is sonically seamed on three sides to ensure a watertight seal long those edges. The dimensions of the pocket are approximately 3 inches wide by approximately 4 inches long. One of the short edges is left open and the steel plate is inserted through this opening. The pocket is trimmed to ¼ inch below the bottom plate. The sonic seams are approximately ¼ inch wide. The plates are approximately 2 inches wide and 3½ inches long.

The ultraviolet light test is set up according to ASTM method G152, cycle 44, which includes (i) exposure to light for 8 hours at 70° C., (ii) subjecting the sample to four hours of darkness under conditions to produce condensation (100% relative humidity at 50° C.), and (iii) irradiating the sample at 1.55 W/m² of ultraviolet radiation. The samples are positioned in the chamber such that the unsealed bottom edge of the samples may receive moisture vapor in the chamber Samples are evaluated visually for corrosion at intervals of 144, 288 and 576 hours. The fabric surrounding the plates is evaluated visually at 576 hours for signs of degradation.

Figure 11:
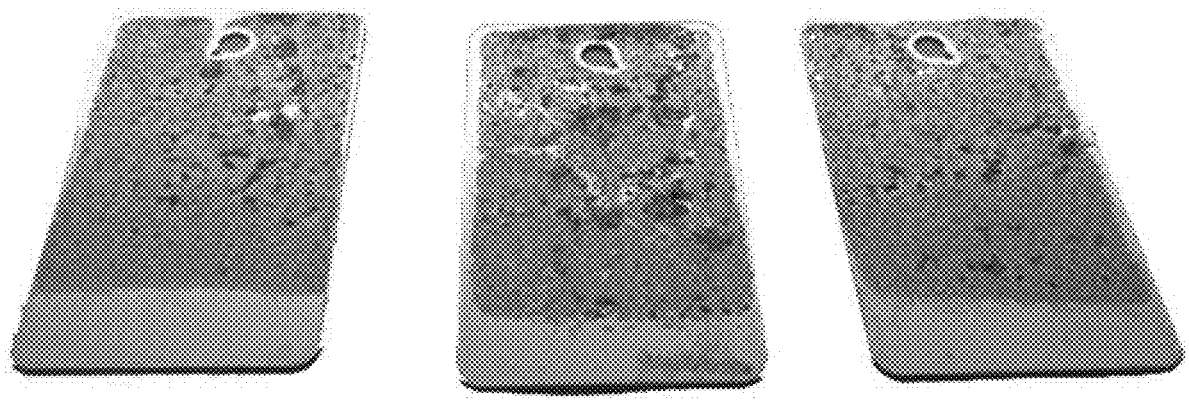
FIG. 11 shows results of a corrosion inhibition of control panels as described in Example 10, after 144 hours.
Figure 12:
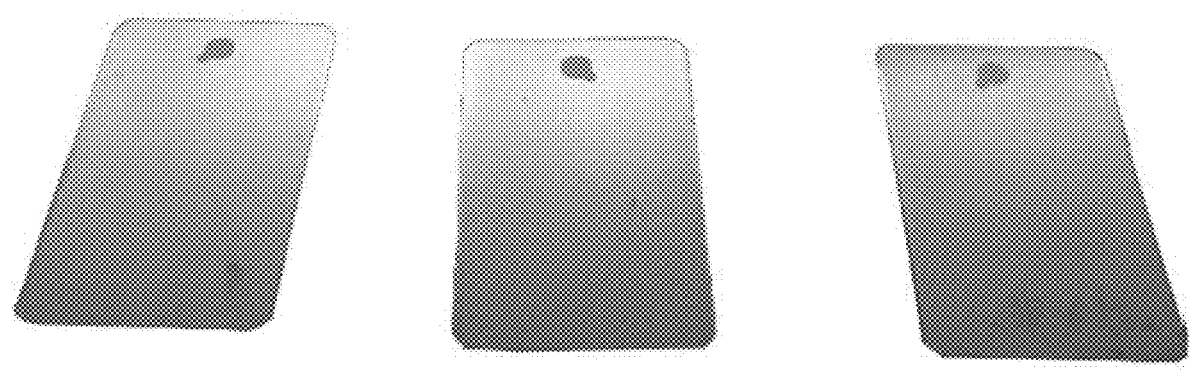
FIG. 12 shows results of a corrosion inhibition of Sample O panels as described in Example 10, after 144 hours.
Figure 13:
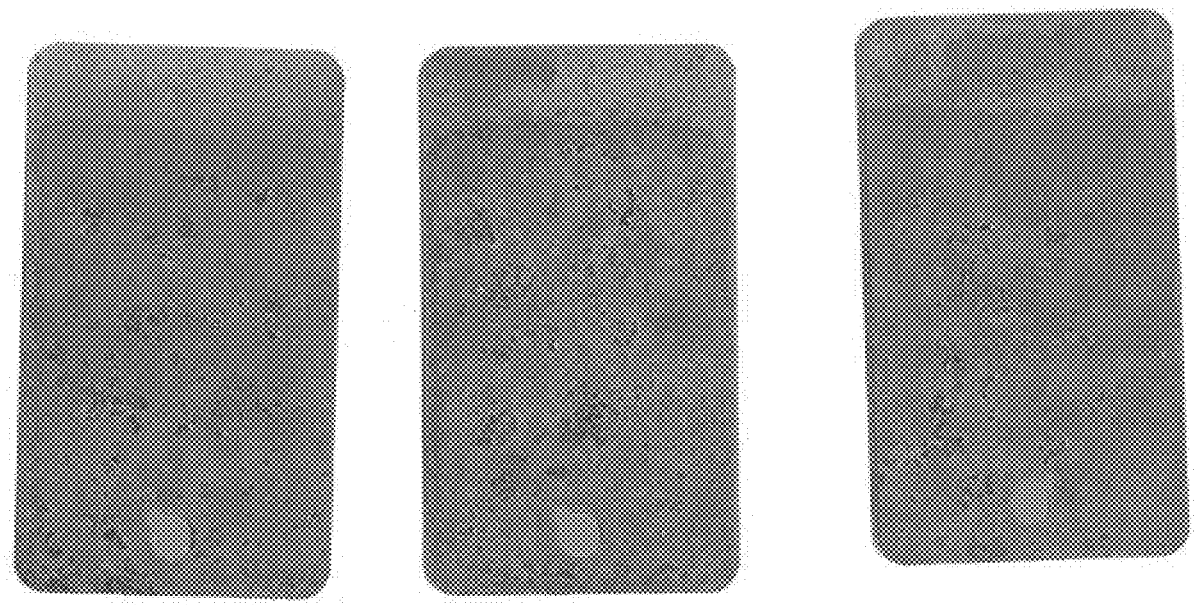
FIG. 13 shows results of a corrosion inhibition of a control panels as described in Example 10, after 288 hours.
Figure 14:
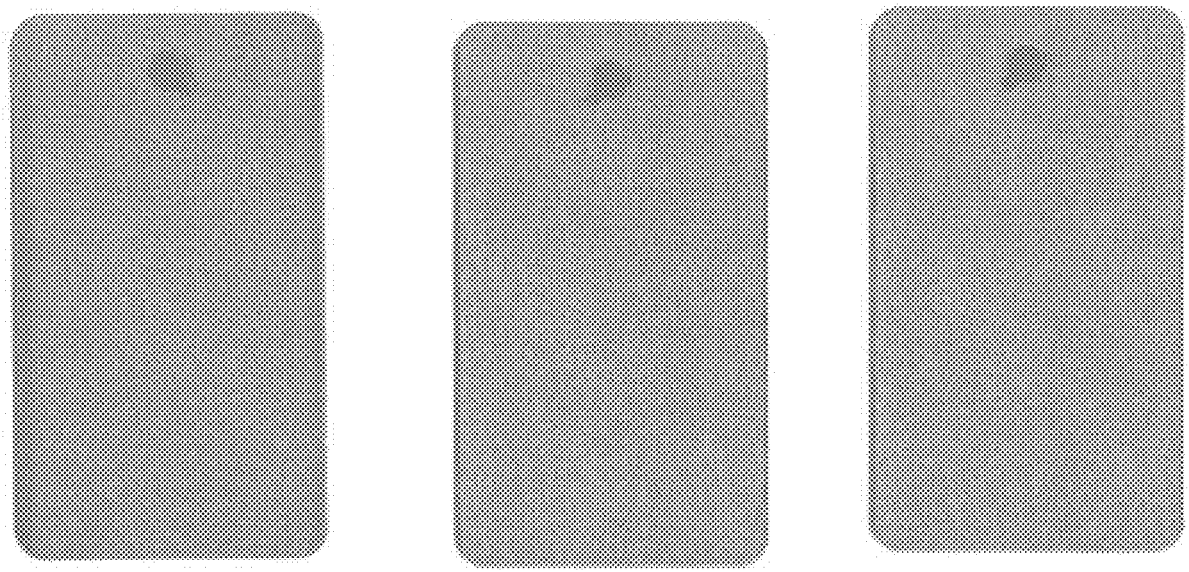
FIG. 14 shows results of a corrosion inhibition of Sample O panels as described in Example 10, after 288 hours.
Figure 15:
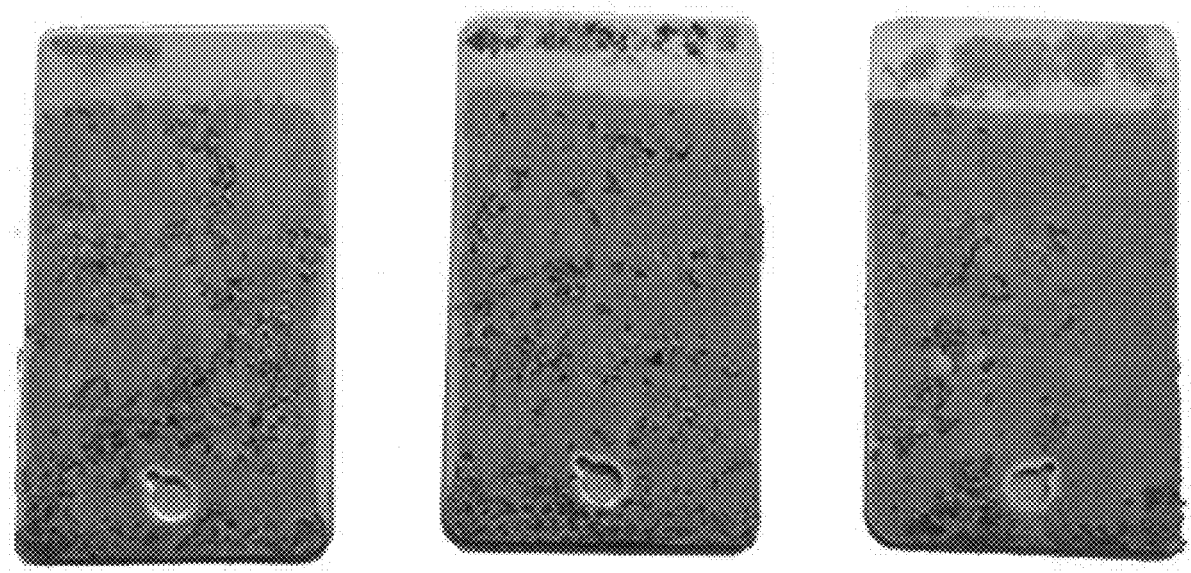
FIG. 15 shows results of a corrosion inhibition of a control panels as described in Example 10, after 576 hours.
Figure 16:
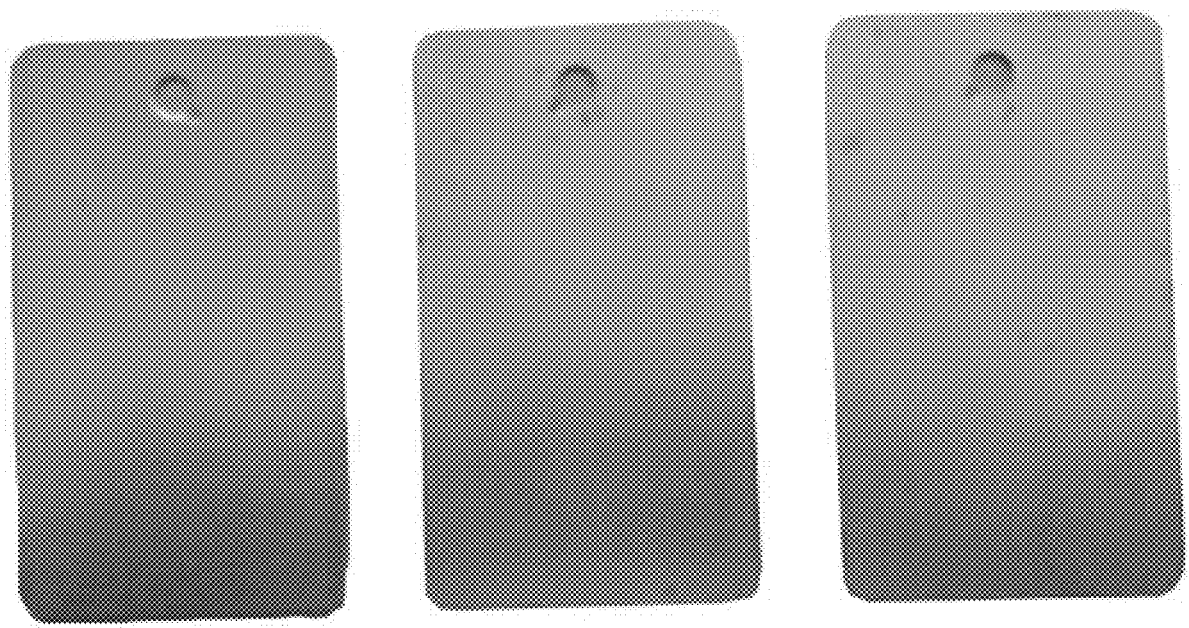
FIG. 16 shows results of a corrosion inhibition of Sample O panels as described in Example 10, after 576 hours.

Three samples (collectively Sample O) was prepared as described above. The samples were tested according to QUV accelerated weathering and compared to control samples at 144 hours, 288 hours, and 576 hours. FIG. 11 shows the control plates after 144 hours and highly corroded. FIG. 12 shows Sample O plates at 144 hours and are substantially free of corrosion. FIG. 13 shows the control plates after 288 hours and is also highly corroded. FIG. 14 shows Sample O plates at 288 hours and are substantially free of corrosion. FIG. 15 shows the control plates after 576 hours and it is again highly corroded. FIG. 16 shows Sample O plates at 576 hours and are substantially free of corrosion. Table 29 shows the results of the optical corrosion optical densities measured for the plate samples of this Example 10.

TABLE 29

| | Corrosion Optical Density | | | | | |
|---|---|---|---|---|---|---|
| | 144 hours | | 288 hours | | 576 hours | |
| | control FIG. 11 | Sample O FIG. 12 | control FIG. 13 | Sample O FIG. 14 | control FIG. 15 | Sample O FIG. 16 |
| n1 | 117 | 158 | 119 | 165 | 111 | 132 |
| n2 | 114 | 151 | 121 | 170 | 110 | 142 |
| n3 | 109 | 142 | 124 | 171 | 112 | 146 |
| Average | 113 | 150 | 121 | 168 | 111 | 140 |

According to the data in Table 29, the extent of corrosion as measured by the optical corrosion optical density may be reduced by more than 26% over the course of 576 hours.

Figure 17:
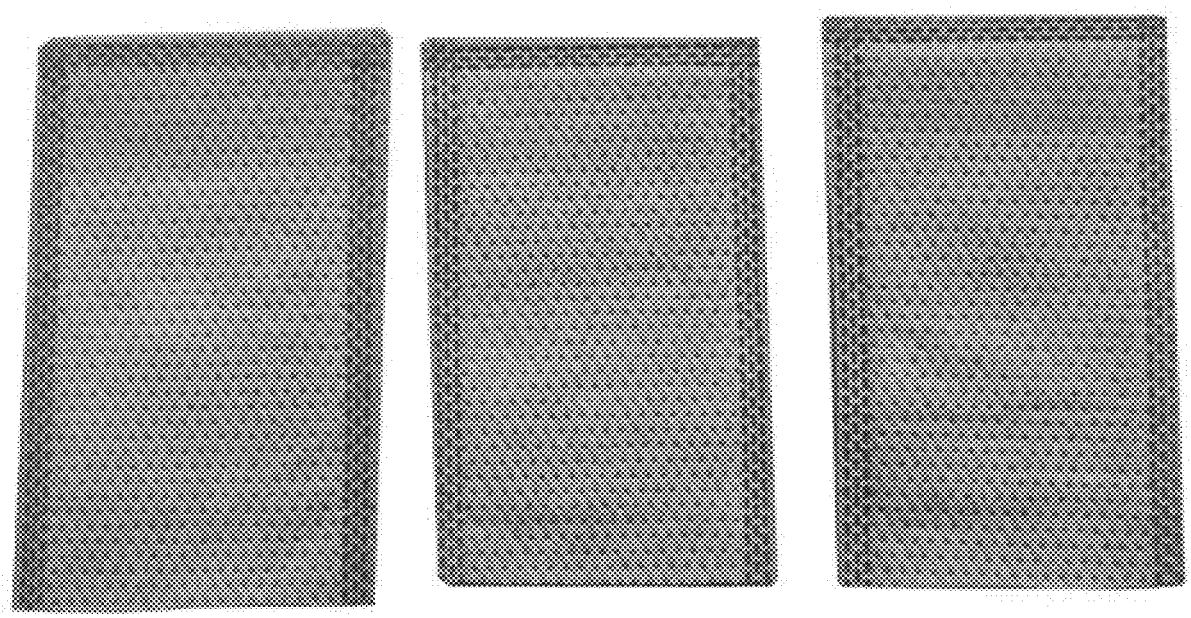
FIG. 17 shows the condition of the control fabric for three samples as described in Example 10, after 576 hours.
Figure 18:
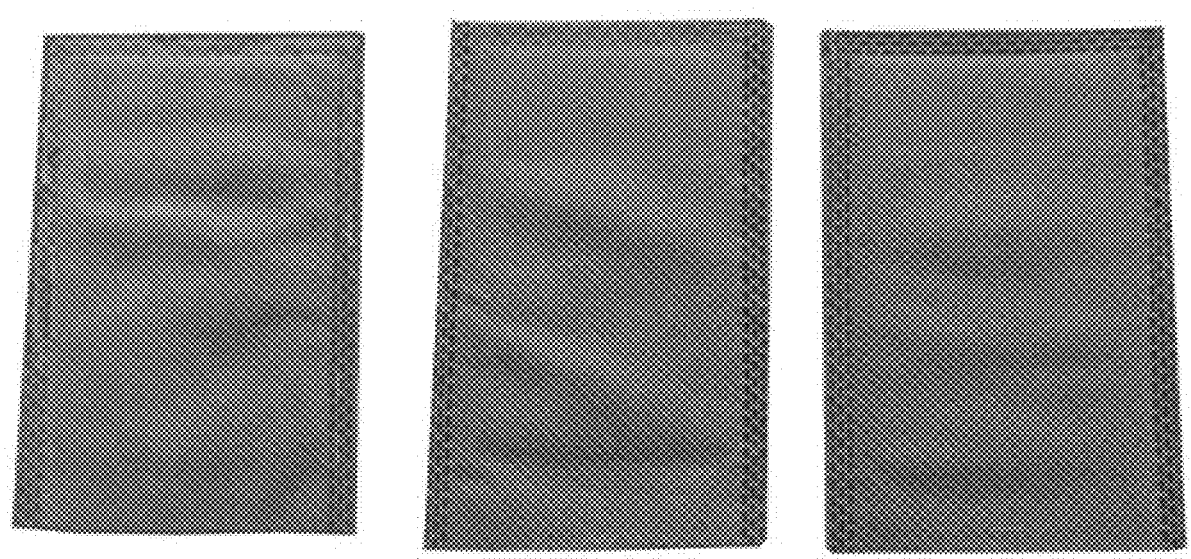
FIG. 18 shows the condition of the Sample O fabric for three samples as described in Example 10, after 576 hours.

FIG. 17 shows the control fabric for three samples after 576 hours and it is apparent that corrosion from the test samples is present on the fabric samples. FIG. 18 shows the fabric for three samples of Sample O at 576 hours and there is no visible corrosion from in these test samples.

As apparent in FIGS. 11-18, the corrosion inhibitor appears to have effectively, efficiently, and rapidly sublimed out of the cover fabric and bonded effectively to the metal surface. The corrosion protection visible at the minimum of 144 hours in FIGS. 11 and 12 suggests a rapid buildup of corrosion-inhibiting vapor within a corrosion protecting environment formed between the metal surface and composite. Based on these tests, it is believed that corrosion inhibition can be achieved quickly upon placing a finished end product composite over any metal product. The corrosion protection lasts through 576 hours of chamber exposure. This is the length of time used for durability testing of similar covers currently used for protective covers.

The control fabrics in FIG. 17 show significant fading and beginning of degradation. At 576 hours, the control fabrics would be expected to be showing this type of degradation. The fabrics of Sample O shown in FIG. 18 appear to exceed the control fabric in both fading resistance and resistance to degradation.

Example 11

Eight samples were prepared in the same manner as Example 1 except with the following film compositions and weights using 88 wt % of the virgin polymer and 12 wt % of a VCI masterbatch (the masterbatch including 85 wt % of the virgin polymer and 15 wt % of the VCI). The virgin polymers and the film weights are provided below.

Sample S: VISTAMAXX™ 6202, 20 gsm film
Sample T: VISTAMAXX™ 6202, 24 gsm film
Sample U: VISTAMAXX™ 6202, 27 gsm film
Sample V: LDPE, 20 gsm film
Sample W: LDPE, 24 gsm film
Sample X: LDPE, 27 gsm film The samples were then tested for corrosion inhabitance (Jar Test described herein, but with a rank of 1 (high corrosion), 2 (moderate corrosion), and 3 (low corrosion)), MVTR, and hydrostatic head (using Textest FX3000 with a gradient of 10 mbar/min). The results are shown in Table 30.

TABLE 30

| Sample | MVTR (g/m$^2$/24 hrs) | Hydrohead (cm) | Corrosion Level |
|---|---|---|---|
| S | 339.5 | 50.4 | 2 |
| T | 153.1 | 60.3 | 2 |
| U | 164.5 | 56.3 | 2 |
| V | 641.0 | 48.5 | 1 |
| W | 305.0 | 58.1 | 3 |
| X | 222.7 | 58.0 | 3 |

The use of an LDPE based VCI masterbatch did not negatively affect hydrohead and appears to positively effect MVTR, The tests show a clear relationship of MVTR to film weight with lower film weights resulting in higher MVTP's. Although the corrosion results seem inconclusive, there was adequate protection with the thinner films.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. When numerical ranges of varying scope are set forth herein, it is contemplated that any combination of these values inclusive of the recited values can be used. Further, ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Unless stated otherwise, the term "about" means within 5% (e.g., within 2% or 1%) of the particular value modified by the term "about." The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed.

What is claimed is:
1. A composite comprising:
a first layer comprising a first nonwoven; and
a second layer adjacent to and melt bonded to the first layer, the second layer
comprising a film including an elastomer having a melt flow index of about 10 g/10 mins to about 300 g/10 mins, and a corrosion inhibitor, wherein the film is (i) vapor-permeable, and (ii) substantially water-impermeable, a third layer adjacent to and melt bonded to the second layer such that the second layer is located between the first layer and the third layer, the third layer comprising a second nonwoven;

wherein the composite has a moisture vapor transmission rate of from about 25 g/m$^2$/day to about 1000 g/m$^2$/day when measured at about 23° C. and about 50 RH %;

wherein the combination of the elastomer and the corrosion inhibitor impart corrosion protection and breathability to the composite.

2. The composite of claim 1, wherein one or more of the first nonwoven and the second nonwoven includes a spunbond layer.

3. The composite of claim 1, wherein the elastomer is present in the second layer in an amount of at least about 50% to about 99%, by weight of the second layer.

4. The composite of claim 1, wherein the corrosion inhibitor is present in an amount of about 0.5% to about 3%, by weight of the second layer.

5. The composite of claim 1, wherein the corrosion inhibitor comprises morpholine.

6. The composite of claim 1, wherein the second layer further comprises a carrier for the corrosion inhibitor.

7. The composite of claim 6, wherein the carrier for the corrosion inhibitor comprises silica.

8. The composite of claim 1, wherein the composite has a hydrostatic head of from about 20 cm to about 200 cm.

9. A protective cover comprising the composite of claim 1.

10. A composite produced by a method comprising extruding a corrosion-inhibiting mixture comprising a propylene-based elastomer having a melt flow index of about 10 g/10 mins to about 300 g/10 mins and a corrosion inhibitor onto a surface of a first nonwoven at an extrusion temperature of from about 170° C. to about 320° C. to form a film layer on the first nonwoven; wherein the film is (i) provided in a non-stretched state, (ii) vapor-permeable, and (iii) substantially water-impermeable, and attaching a second nonwoven to the film such that the film is located between the first nonwoven and the second nonwoven.

11. The composite of claim 1, wherein the composite comprises an extrusion laminate.

12. The composite of claim 1, wherein the elastomer comprises a copolymer or ethylene units and propylene units.

13. The composite of claim 1, wherein the composite has a cross-direction elongation of at least about 120% as determined according to ASTM D5034.

14. The composite of claim 1, wherein the first nonwoven has a first basis weight and the second nonwoven has a second basis weight, wherein the second basis weight is less than the first basis weight.

* * * * *